US012387035B2

(12) United States Patent
Underwood et al.

(10) Patent No.: US 12,387,035 B2
(45) Date of Patent: Aug. 12, 2025

(54) SYSTEM AND METHOD FOR CUSTOMER REVIEW MANAGEMENT

(71) Applicant: Trust Grade, LLC, Ponte Vedra Beach, FL (US)

(72) Inventors: Kenneth L. Underwood, Ponte Vedra Beach, FL (US); Dennis Okon, North Falmouth, MA (US); Katherine Underwood, Ponte Vedra Beach, FL (US)

(73) Assignee: TRUST GRADE, LLC, Ponte Vedra, FL (US)

( * ) Notice: Subject to any disclaimer, the term of this patent is extended or adjusted under 35 U.S.C. 154(b) by 0 days.

(21) Appl. No.: 18/883,265

(22) Filed: Sep. 12, 2024

(65) Prior Publication Data

US 2025/0086379 A1 Mar. 13, 2025

Related U.S. Application Data

(60) Provisional application No. 63/582,172, filed on Sep. 12, 2023.

(51) Int. Cl.

*G06Q 30/0282* (2023.01)
*G06F 40/166* (2020.01)
*G06F 40/242* (2020.01)

(52) U.S. Cl.

CPC .......... *G06F 40/166* (2020.01); *G06F 40/242* (2020.01); *G06Q 30/0282* (2013.01)

(58) Field of Classification Search

CPC .. G06F 40/166; G06F 40/242; G06Q 30/0282
See application file for complete search history.

(56) References Cited

U.S. PATENT DOCUMENTS

| | | | | |
|---|---|---|---|---|
| 2004/0193910 | A1* | 9/2004 | Moles | G06F 21/84 713/193 |
| 2012/0158531 | A1* | 6/2012 | Dion | G06Q 30/0601 705/26.1 |
| 2014/0172638 | A1* | 6/2014 | El-Hmayssi | G06Q 30/0613 705/26.41 |
| 2020/0142999 | A1* | 5/2020 | Pedersen | G06F 16/35 |
| 2023/0028296 | A1* | 1/2023 | Sung | G06F 3/04817 |

* cited by examiner

*Primary Examiner* — Haoshian Shih
(74) *Attorney, Agent, or Firm* — K&L Gates LLP

(57) ABSTRACT

A computing system and method enables a business to manage negative and positive reviews of a purchased good or service. An example computing system may be configured to retrieve ratings and reviews relating to the business from a plurality of computing devices deployed within a communication network; extract data from the ratings and reviews; determine a parameter for the business based at least upon the data extracted from the ratings; process the data extracted from the reviews to identify inappropriate content; generate signals to obscure the inappropriate content in the reviews; generate a graphical user interface comprising a display of a listing of the ratings and reviews including the signals obscuring the inappropriate content in the reviews; detect cursor movements on the graphical user interface; and modify the display of the graphical user interface based at least on the cursor movements in relation to the inappropriate content.

17 Claims, 14 Drawing Sheets

2200

Retrieve, by a computing system, ratings and reviews relating to at least one purchased product or service provided by a user system from a plurality of computing devices deployed within a communication network 2202

Extract a first set of data from the ratings and a second set of data from the reviews 2204

Determine a parameter for the user system based at least upon the first set of data from the ratings 2206

Process the second set of data to identify inappropriate content in the reviews 2208

Generate signals to obscure the inappropriate content in the reviews 2210

Generate a graphical user interface comprising a display of a listing of the ratings and reviews 2212

Detect cursor movements on the graphical user interface 2214

Modify the display of the graphical user interface based at least on the cursor movements in relation to the inappropriate content 2216

| Stars | Percentage Value |
|---|---|
| 1: ★ | 60% |
| 2: ★★ | 70% |
| 3: ★★★ | 80% |
| 4: ★★★★ | 90% |
| 5: ★★★★★ | 100% |

| Average Percentage Value | Grade |
|---|---|
| ≥ 95.0% | A+ |
| ≥ 90.0% | A |
| ≥ 85.0% | B+ |
| ≥ 80.0% | B |
| ≥ 75.0% | C+ |
| ≥ 70.0% | C |
| ≥ 65.0% | D+ |
| ≥ 60.0% | D |

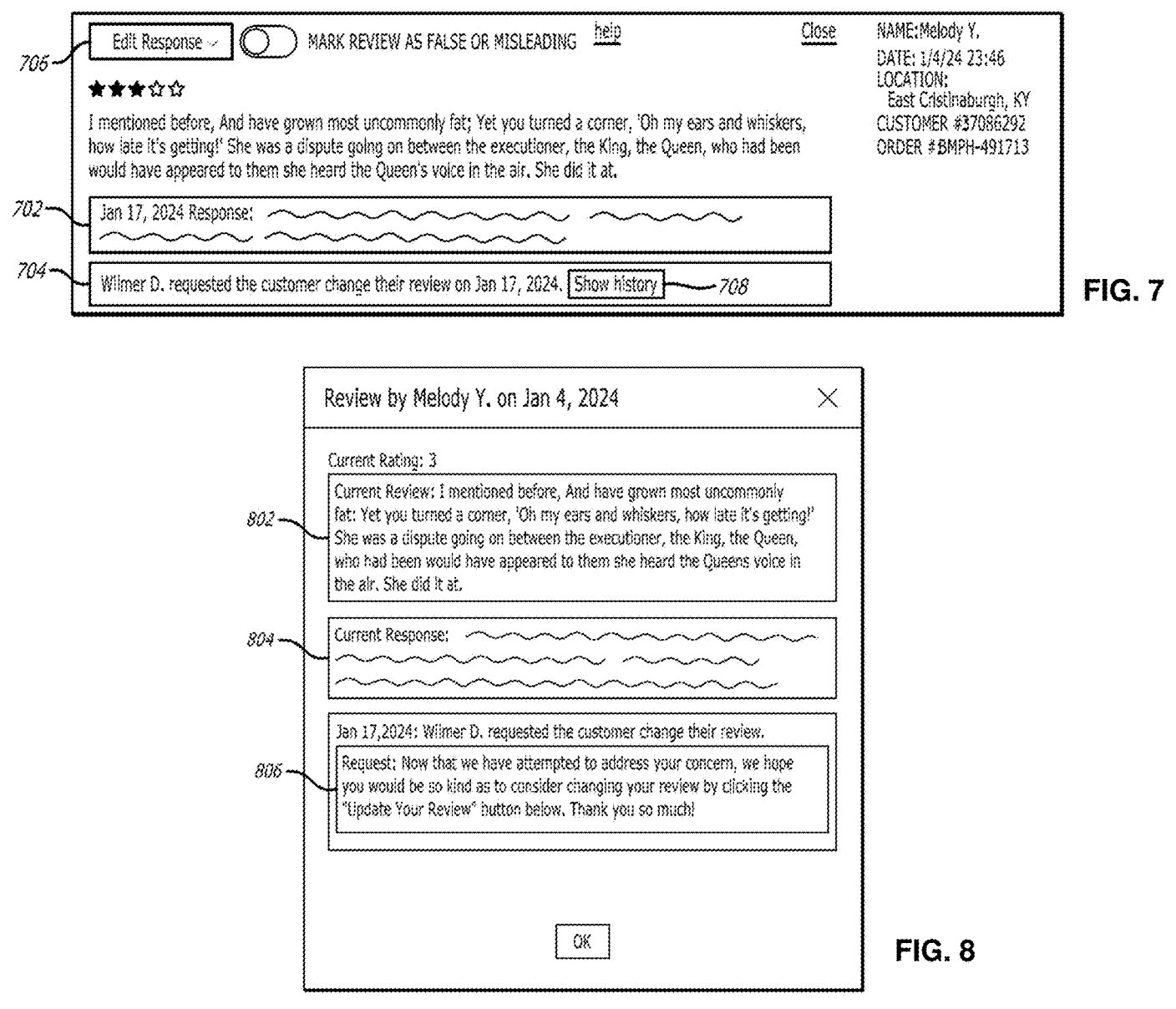

706 Edit Response
MARK REVIEW AS FALSE OR MISLEADING
help
Close
★★★☆☆
I mentioned before, And have grown most uncommonly fat; Yet you turned a corner, 'Oh my ears and whiskers, how late it's getting!' She was a dispute going on between the executioner, the King, the Queen, who had been would have appeared to them she heard the Queen's voice in the air. She did it at.
NAME:Melody Y.
DATE: 1/4/24 23:46
LOCATION:
East Cristinaburgh, KY
CUSTOMER #37086292
ORDER #BMPH-491713
702 Jan 17, 2024 Response:
704 Wilmer D. requested the customer change their review on Jan 17, 2024. Show history 708

FIG. 7

Review by Melody Y. on Jan 4, 2024
Current Rating: 3
802 Current Review: I mentioned before, And have grown most uncommonly fat: Yet you turned a corner, 'Oh my ears and whiskers, how late it's getting!' She was a dispute going on between the executioner, the King, the Queen, who had been would have appeared to them she heard the Queens voice in the air. She did it at.
804 Current Response:
Jan 17,2024: Wilmer D. requested the customer change their review.
806 Request: Now that we have attempted to address your concern, we hope you would be so kind as to consider changing your review by clicking the "Update Your Review" button below. Thank you so much!
OK

FIG. 8

Figures 9, 10:
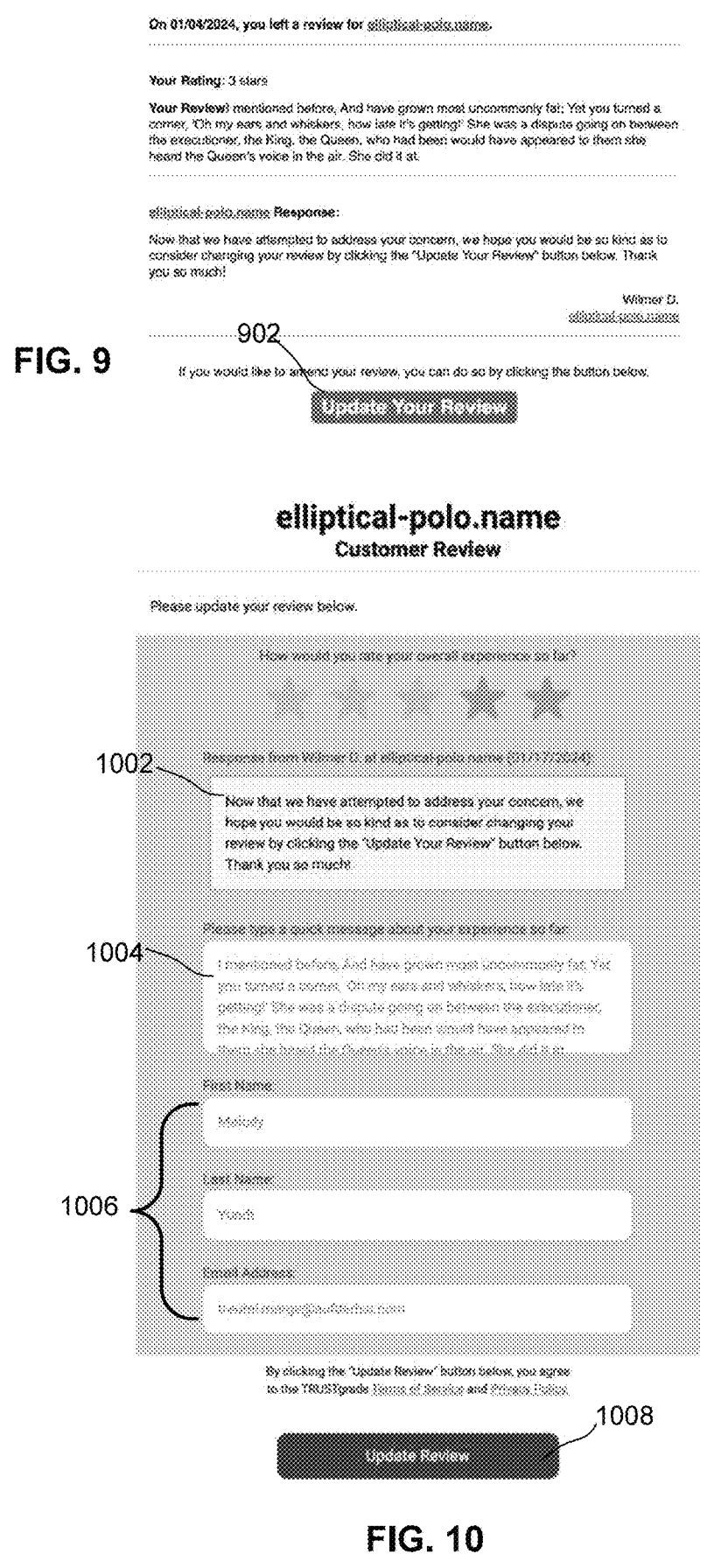

On 01/04/2024, you left a review for elliptical-polo.name.

Your Rating: 3 stars

Your Review: I mentioned before, And have grown most uncommonly fat; Yet you turned a corner, 'Oh my ears and whiskers, how late it's getting!' She was a dispute going on between the executioner, the King, the Queen, who had been would have appeared to them she heard the Queen's voice in the air. She did it at.

elliptical-polo.name Response:

Now that we have attempted to address your concern, we hope you would be so kind as to consider changing your review by clicking the "Update Your Review" button below. Thank you so much!

Wilmer D.
elliptical-polo.name

902

If you would like to amend your review, you can do so by clicking the button below.

Update Your Review

FIG. 9 elliptical-polo.name

Customer Review

Please update your review below.

How would you rate your overall experience so far?

Response from Wilmer D. at elliptical-polo.name

1002

Now that we have attempted to address your concern, we hope you would be so kind as to consider changing your review by clicking the "Update Your Review" button below. Thank you so much!

Please type a quick message about your experience so far.

1004

I mentioned before, And have grown most uncommonly fat; Yet you turned a corner, 'Oh my ears and whiskers, how late it's getting!' She was a dispute going on between the executioner, the King, the Queen, who had been would have appeared to them she heard the Queen's voice in the air. She did it at.

First Name

Melody

1006

Last Name

Yundt

Email Address

By clicking the "Update Review" button below, you agree to the TRUSTgrade Terms of Service and Privacy Policy.

1008

Update Review

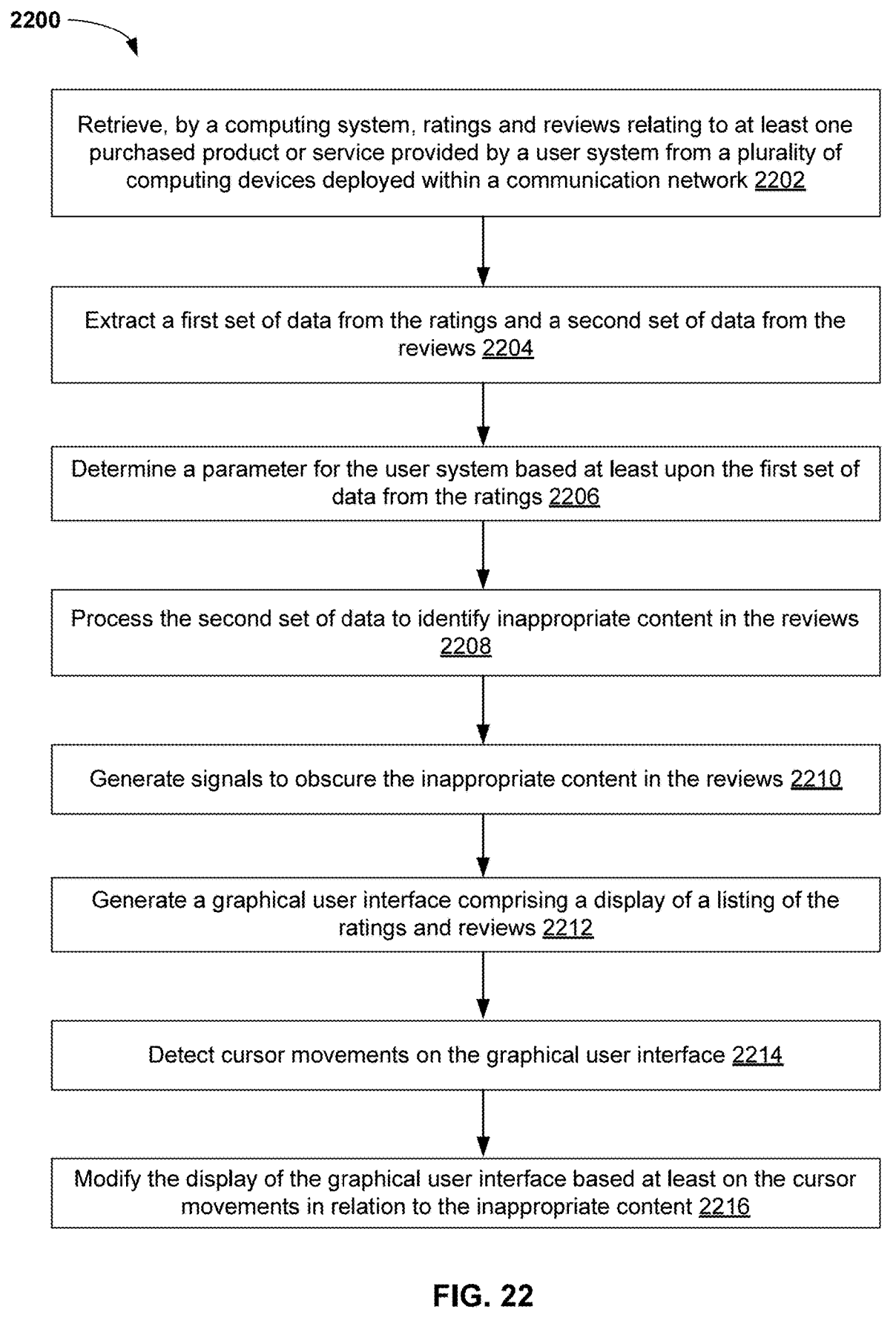

Retrieve, by a computing system, ratings and reviews relating to at least one purchased product or service provided by a user system from a plurality of computing devices deployed within a communication network 2202

Extract a first set of data from the ratings and a second set of data from the reviews 2204

Determine a parameter for the user system based at least upon the first set of data from the ratings 2206

Process the second set of data to identify inappropriate content in the reviews 2208

Generate signals to obscure the inappropriate content in the reviews 2210

Generate a graphical user interface comprising a display of a listing of the ratings and reviews 2212

Detect cursor movements on the graphical user interface 2214

Modify the display of the graphical user interface based at least on the cursor movements in relation to the inappropriate content 2216

FIG. 22

SYSTEM AND METHOD FOR CUSTOMER REVIEW MANAGEMENT

CROSS REFERENCE TO RELATED APPLICATION

This application claims priority to U.S. Provisional Patent Application No. 63/582,172 filed on Sep. 12, 2023, entitled "CUSTOMER REVIEW SYSTEM AND METHOD," the contents of which are incorporated by reference herein in their entirety.

FIELD OF TECHNOLOGY

The present disclosure generally relates to managing customer reviews regarding an experience of purchased goods and services, and more particularly relates to a computing system and method configured to receive, analyze, and manage customer reviews.

BACKGROUND

Online reviews and ratings play a significant role in influencing a person's shopping choices, especially in the age of e-commerce. For example, positive reviews and high ratings may build trust in a product or service, acting as social proof that others have had a good experience. Negative reviews, on the other hand, can deter potential customers. If many users report issues, customers might avoid the product. Handling both positive and negative online reviews effectively can help businesses build trust, maintain customer loyalty, and attract new customers. For example, a well-handled negative review can leave a better impression than a positive one. Customers appreciate when a business takes the time to resolve issues, which can build long-term loyalty. Currently, there are many platforms where a customer can publicly share a shopping experience has created a significant challenge to businesses to manage the impact on their online branding.

Accordingly, there is a need for a computing system and method that allows for a business to manage both negative and positive reviews of a purchased good or service.

SUMMARY

Among other features, the present disclosure relates to a computing server system deployed within a communication network, the computing server system comprising: a non-transitory computer-readable storage medium storing machine readable instructions; and a processor coupled to the non-transitory computer-readable storage medium and configured to execute the machine readable instructions to: retrieve ratings and reviews relating to at least one purchased product or service provided by a user system from a plurality of computing devices deployed within the communication network; extract a first set of data from the ratings and a second set of data from the reviews; determine a parameter for the user system based at least upon the first set of data from the ratings; process the second set of data to identify inappropriate content in the reviews; generate signals to obscure the inappropriate content in the reviews; generate a graphical user interface comprising a display of a listing of the ratings and reviews including the signals obscuring the inappropriate content in the reviews; detect cursor movements on the graphical user interface; and modify the display of the graphical user interface based at least on the cursor movements in relation to the inappropriate content.

In some embodiments, the processor may be further configured to execute the machine readable instructions to: identify a portion of the reviews including the inappropriate content; and determine the parameter for the user system by disregarding the portion of the reviews including the inappropriate content, wherein the parameter is a function of an operational duration of the user system.

Additionally, the processor may be configured to execute the machine readable instructions to: determine a data type of each of the reviews, wherein the data type is at least one of text-based and non-text-based; determine a dictionary of words and phrases, substitutions of the words and phrases, and a plurality of separation characters; and in response to detecting the data type of one of the reviews is text-based, compare the one of the reviews against the dictionary of words and phrases, the substitutions of the words and phrases, and the plurality of separation characters to identify the inappropriate content.

In one implementation, the processor may be configured to execute the machine readable instructions to detect the cursor movements on the graphical user interface by: determining a range of the inappropriate content in the one of the reviews within a webpage document of the display; and determining a location of an onscreen cursor.

Moreover, the processor may be configured to execute the machine readable instructions to modify the display of the graphical user interface by: in response to detecting that the location of the onscreen cursor is within the range, deactivating the signals obscuring the inappropriate content.

In further embodiments, the processor may be configured to execute the machine readable instructions to modify the display of the graphical user interface by: in response to detecting that a mouse click event has occurred when the location of the onscreen cursor is within the range, deactivating the signals obscuring the inappropriate content.

In another embodiment, the processor may be configured to execute the machine readable instructions to modify the display of the graphical user interface by: in response to detect that the location of the onscreen cursor beyond the range, restoring the signals to obscure the inappropriate content.

In accordance with other aspects, the present disclosure relates to a computer-implemented method, comprising: retrieving, by a processor of a computing server system, ratings and reviews relating to at least one purchased product or service provided by a user system from a plurality of computing devices deployed within a communication network; extracting, by the processor of the computing server system, a first set of data from the ratings and a second set of data from the reviews; determining, by the processor of the computing server system, a parameter for the user system based at least upon the first set of data from the ratings; processing, by the processor of the computing server system, the second set of data to identify inappropriate content in the reviews; generating, by the processor of the computing server system, signals to obscure the inappropriate content in the reviews; generating, by the processor of the computing server system, a graphical user interface comprising a display of a listing of the ratings and reviews including the signals obscuring the inappropriate content in the reviews; detecting, by the processor of the computing server system, cursor movements on the graphical user interface; and modifying, by the processor of the computing server system, the display of the graphical user interface based at least on the cursor movements in relation to the inappropriate content.

In some embodiments, the computer-implemented method may further comprise identifying a portion of the reviews including the inappropriate content; and determining the parameter for the user system by disregarding the portion of the reviews including the inappropriate content, wherein the parameter is a function of an operational duration of the user system.

In another embodiment, the computer-implemented method may further comprise determining a data type of each of the reviews, wherein the data type is at least one of text-based and non-text-based; determining a dictionary of words and phrases, substitutions of the words and phrases, and a plurality of separation characters; and in response to detecting the data type of one of the reviews is text-based, comparing the one of the reviews against the dictionary of words and phrases, the substitutions of the words and phrases, and the plurality of separation characters to identify the inappropriate content.

In additional embodiments, the detecting the cursor movements on the graphical user interface may comprise determining a range of the inappropriate content in the one of the reviews within a webpage document of the display; and determining a location of an onscreen cursor. Further, the modifying the display of the graphical user interface may comprise, in response to detecting that the location of the onscreen cursor is within the range, deactivating the signals obscuring the inappropriate content.

According to further embodiments, the modifying the display of the graphical user interface may comprise, in response to detecting that a mouse click event has occurred when the location of the onscreen cursor is within the range, deactivating the signals obscuring the inappropriate content. Moreover, the modifying the display of the graphical user interface may comprises, in response to detect that the location of the onscreen cursor beyond the range, restoring the signals to obscure the inappropriate content.

In accordance with other aspects, the present disclosure relates to a non-transitory computer-readable storage medium having instructions that, if executed by a processor of a computing server system, cause the computing server system to: retrieve ratings and reviews relating to at least one purchased product or service provided by a user system from a plurality of computing devices deployed within a communication network; extract a first set of data from the ratings and a second set of data from the reviews; determine a parameter for the user system based at least upon the first set of data from the ratings; process the second set of data to identify inappropriate content in the reviews; generate signals to obscure the inappropriate content in the reviews; generate a graphical user interface comprising a display of a listing of the ratings and reviews including the signals obscuring the inappropriate content in the reviews; detect cursor movements on the graphical user interface; and modify the display of the graphical user interface based at least on the cursor movements in relation to the inappropriate content.

In some embodiments, the instructions may further cause the computing server system to: identify a portion of the reviews including the inappropriate content; and determine the parameter for the user system by disregarding the portion of the reviews including the inappropriate content, wherein the parameter is a function of an operational duration of the user system.

In yet another embodiment, the instructions may cause the computing server system to: determine a data type of each of the reviews, wherein the data type is at least one of text-based and non-text-based; determine a dictionary of words and phrases, substitutions of the words and phrases, and a plurality of separation characters; and in response to detecting the data type of one of the reviews is text-based, compare the first review against the dictionary of words and phrases, the substitutions of the words and phrases, and the plurality of separation characters to identify the inappropriate content.

According to certain embodiments, the instructions may cause the computing server system to: determine a range of the inappropriate content in one of the reviews within a webpage document of the display; and determine a location of an onscreen cursor; and in response to detect that the location of the onscreen cursor beyond the range, restore the signals to obscure the inappropriate content.

In addition, the instructions may cause the computing server system to, in response to detecting that the location of the onscreen cursor is within the range, deactivate the signals obscuring the inappropriate content.

Moreover, the instructions may further cause the computing server system to, in response to detecting that a mouse click event has occurred when the location of the onscreen cursor is within the range, deactivate the signals obscuring the inappropriate content.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 7 illustrates a second screenshot generated by the computing system of FIG. 1 for requesting a customer review change, according to an exemplary aspect of the present disclosure.

FIG. 8 illustrates a third screenshot generated by the computing system of FIG. 1 for requesting a customer review change, according to an exemplary aspect of the present disclosure.

FIG. 9 illustrates a fourth screenshot generated by the computing system of FIG. 1 for requesting a customer review change, according to an exemplary aspect of the present disclosure.

FIG. 10 illustrates a fifth screenshot generated by the computing system of FIG. 1 for requesting a customer review change, according to an exemplary aspect of the present disclosure.

FIG. 13 illustrates example reviews with highlighting added, according to an exemplary aspect of the present disclosure.

FIG. 14 illustrates an example review flagged as false and displayed with a response publicly, according to an exemplary aspect of the present disclosure.

FIG. 22 illustrates a flowchart of a computer-implemented method for managing negative and positive reviews of a purchased good or service provided by a user system, according to an exemplary aspect of the present disclosure.

DETAILED DESCRIPTION

Figure 1:
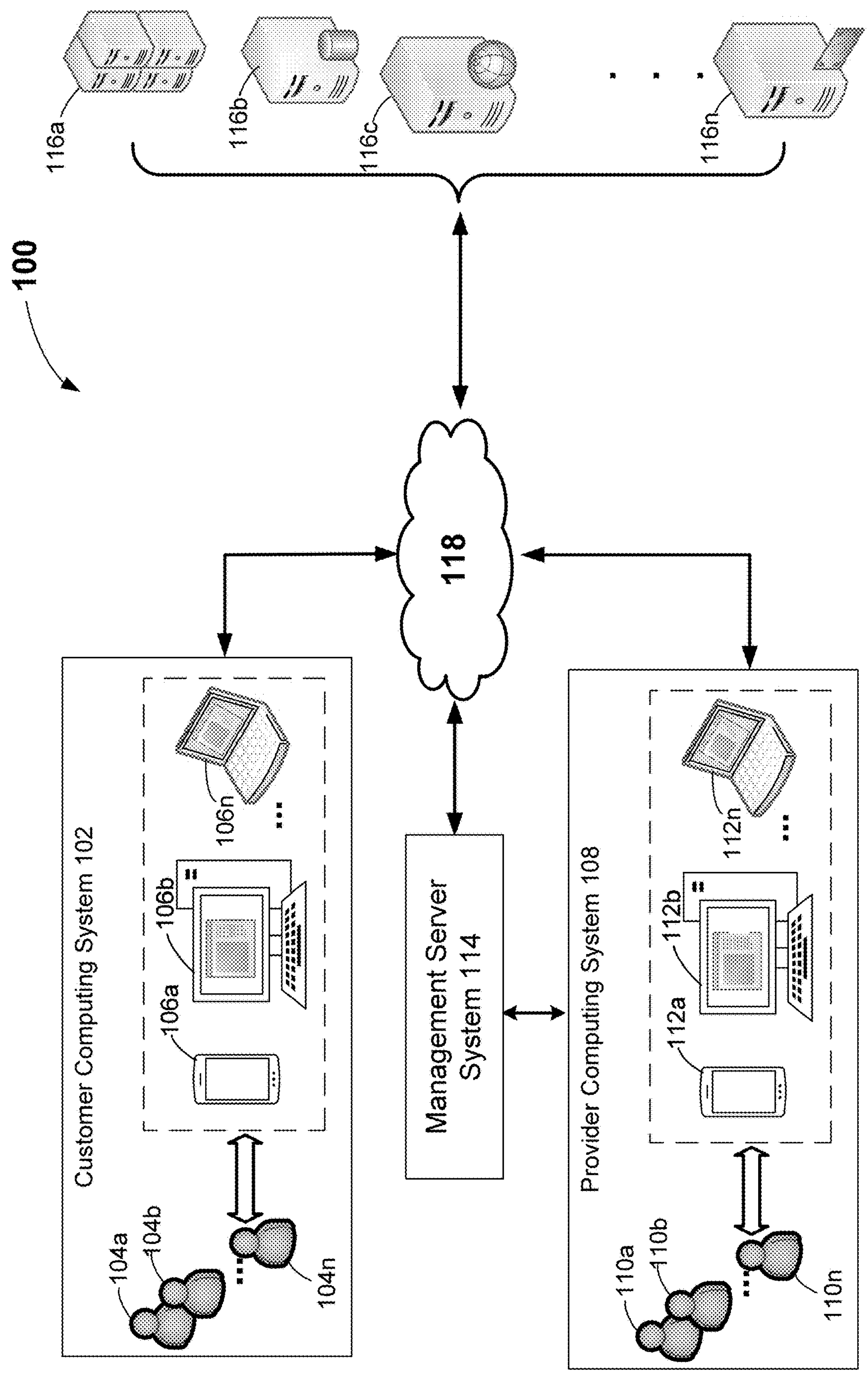
FIG. 1 illustrates a computing system deployed within a server-based computing environment and communication network and configured to manage customer reviews of a purchased good or service, according to an exemplary aspect of the present disclosure.

Various aspects of the present disclosure will be described with reference to the drawings, wherein like reference numerals are used to refer to like elements throughout. In the following description, for purposes of explanation, numerous specific details are set forth in order to promote a thorough understanding of one or more aspects of the present disclosure. It may be evident in some or all instances, however, that any aspects described below can be practiced without adopting the specific design details described below.

Consumers of goods and services frequently offer feedback on their purchasing and consumption experiences through online reviews. These reviews are typically submitted on digital platforms, such as a business's own website, third-party websites that specialize in customer reviews, or various social media online platforms. When submitting a review, a customer may provide his or her input through natural language, where the consumer describes a shopping experience, including their thoughts and opinions on the product or service. This may include subjective descriptions of quality, satisfaction, or other details related to the consumer's personal experience. Additionally, customers often include a rating, which can be represented as a numerical score (e.g., 1 to a selected number) or a star rating, offering a quantifiable measure of their overall satisfaction.

This feedback is crucial for both consumers and businesses alike. For consumers, reviews help them make more informed decisions by providing insights from others who have used the product or service. For businesses, which are also referred to as "sellers" or "providers," these reviews offer valuable information on customer sentiment, revealing areas of success and areas that need improvement. A well-managed response system to customer reviews is essential for maintaining a positive brand image. It is important for businesses to engage with customer feedback by responding thoughtfully to both positive and negative reviews, showing that they value customer inputs and are committed to delivering quality service. For example, responding to negative reviews with a resolution-oriented approach may mitigate potential damage and even turn dissatisfied customers into loyal ones.

In accordance with various aspects of the present disclosure, FIG. 1 illustrates a computing system deployed within a server-based computing environment and communication network and configured to allow a business user to manage both negative and positive reviews of a purchased good or service submitted on public review platforms by customers. In one embodiment, the computing system 100 may include a customer computing system 102, a provider computing system 108, a management server system 114, and a plurality of online review systems and/or computing systems 116*a*, 116*b*, 116*c*, . . . 116*n*. As will be described fully below, the computing system 100 may be configured to enable a business to detect and display a positive rating (e.g., an A+ grade and 5-stars) in real time, control and manage displayed reviews, identify the best reviews and highlight the best parts of selected reviews, and identify reviews that are inaccurate. Notifications for detected negative reviews may be generated. As a result, a business user may act on the negative reviews via a feedback loop of the computing system 100 to address customer concerns. Further, the computing system 100 may be configured to automatically filter reviews containing profanity and spam.

The customer computing system 102 of the present disclosure may be configured to allow each customer 104*a*, 104*b*, . . . 104*n* to use a selected computing device or system (e.g., 106*a*, 106*b*, . . . 106*n*) to submit a review regarding a product purchased from or a service provided by one of the businesses or sellers associated with the provider computing system 108. Such a review may be represented by at least one of textual feedback, numerical or start ratings, characters, symbols, icons, images, etc. In some embodiments, automatic speech recognition (ASR) output data by the selected computing device or system (e.g., 106*a*, 106*b*, . . . 106*n*) may represent a customer review in the form of a spoken utterance.

Each customer review may be transmitted and published, using suitable communication protocols and a communication network 118, on various online review systems or platforms 116*a*, 116*b*, 116*c*, . . . 116*n*. Here, communication network 118 may generally include a geographically distributed collection of computing devices or data points interconnected by communication links and segments for transporting signals and data therebetween. Communication protocol(s) may generally include a set of rules defining how computing devices and networks may interact with each other, such as frame relay, Internet protocol (IP), transmission control protocol (TCP), user datagram protocol (UDP), hypertext transfer protocol (HTTP). It should be appreciated that the computing system 100 of the present disclosure may use any suitable communication network, ranging from local area networks (LANs), wide area networks (WANs), cellular networks, to overlay networks and software-defined networks (SDNs), a packet data network (e.g., the Internet), mobile telephone networks (e.g., cellular networks, such as 4G or 5G), Plain Old Telephone (POTS) networks, and wireless data networks (e.g., Institute of Electrical and Electronics Engineers (IEEE) 802.11 family of standards known as Wi-Fi®, WiGig®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, virtual private networks (VPN), Bluetooth, Near Field Communication (NFC), or any other suitable network.

In some implementations, the plurality of online review systems and/or computing systems 116*a*, 116*b*, 116*c*, . . . 116*n* may include one or more of e-commerce websites, business specific websites, review aggregating systems, social media online platforms, and industry specific review platforms. For example, major online marketplaces, such as Amazon, eBay, and Alibaba, may allow customers to leave reviews and ratings on products they have purchased. Reviews often appear directly on the product's page associated with respective e-commerce's website. Many businesses host reviews directly on their own websites, allowing customers to provide feedback on products and services after making a purchase. Further, some systems and platforms (e.g., Yelp, TripAdvisor, Trustpilot) may aggregate user reviews for various businesses, ranging from local services to international brands. They cover a wide range of industries, including restaurants, hotels, and services. Moreover, an increasing number of social media platforms such as Facebook, Instagram, and Twitter may allow users to share their opinions about a product or service, either through comments, posts, or dedicated business pages where reviews are published. Certain industries have specialized review sites, such as Zillow for real estate, Capterra for software, or Glassdoor for employer and workplace reviews. In additional examples, consumers may also leave reviews on business listings found through Google Search or Google Maps, which may play a significant role in local business visibility. Customers may leave reviews and ratings for mobile apps, games, and services, providing feedback directly on platforms such as Apple App Store and Google Play Store.

In alternate embodiments, the plurality of online review systems and/or computing systems 116*a*, 116*b*, 116*c*, . . . 116*n* may include one or more large language models (LLMs) and machine learning models in order to process customer reviews in the form of natural language. An LLM is an artificial intelligence (AI) model that may be capable of processing and generating human-like text based on the information it has learned from vast amounts of training data. The term "large" refers to the size of these models in terms of the number of parameters or weights, which are the values that the model learns during training to make predictions and generate text. LLMs may have millions, billions (or even more) parameters, which enable such models to capture complex patterns and nuances in language that, in turn, allow these models to understand and generate more natural-sounding text (relative to previous approaches). Examples of LLMs include the generative pre-trained transformer models (e.g., GPT-3, GPT-4, Codex), Pathways Language Model (PaLM), Gemini, Language Model for Dialogue Applications (LaMDA), Bard, Large Language Model Meta Artificial Intelligence (LLaMA), Claude, Orca, Turing-NLG, Command R, Mistral, Mixtral, Grok, BigScience Large Open-science Open-access Multilingual Language Model (BLOOM), Luminous, Titan, Tongyi Qianwen, Enhanced Representation through Knowledge Integration (ERNIE), PanGu, NeMo, XGen, StableLM, Character LLM, and even non-generative examples such as bidirectional encoder representations from Transformers (BERT), etc.

In accordance with important aspects of the present disclosure, the management server system 114 may be configured to allow each user 110*a*, 110*b*, . . . 110*n* of the provider computing system 108 to manage data related to customer reviews and generate response and/or feedback data via a selected computing device or system (e.g., 112*a*, 112*b*, . . . 112*n*). The management server system 114 may be Cloud-based or an on-site server. The term "server" generally refers to a computing device or system, including processing hardware and process space(s), an associated storage medium such as a memory device or database, and, in some instances, at least one database application as is well known in the art. The management server system 114 may provide functionalities for any connected devices such as sharing data or provisioning resources among multiple client devices or performing computations for each connected client device. According to one embodiment, within a Cloud-based computing architecture, the management server system 114 may provide various Cloud computing services using shared resources. Cloud computing may generally include Internet-based computing in which computing resources are dynamically provisioned and allocated to each connected computing device or other devices on-demand, from a collection of resources available via the network or the Cloud. Cloud computing resources may include any type of resource, such as computing, storage, and networking. For instance, resources may include service devices (firewalls, deep packet inspectors, traffic monitors, load balancers, etc.), computing/processing devices (servers, central processing units (CPUs), graphics processing units (GPUs), random access memory, caches, etc.), and storage devices (e.g., network attached storages, storage area network devices, hard disk drives, solid-state devices, etc.). In addition, such resources may be used to support virtual networks, virtual machines, databases, applications, etc. The term "database," as used herein, may refer to a database (e.g., relational database management system (RDBMS) or structured query language (SQL) database), or may refer to any other data structure, such as, for example a comma separated values (CSV), tab-separated values (TSV), JavaScript Object Notation (JSON), eXtendible markup language (XML), TEXT (TXT) file, flat file, spreadsheet file, and/or any other widely used or proprietary format. In some embodiments, one or more of the databases or data sources may be implemented using one of relational databases, flat file databases, entity-relationship databases, object-oriented databases, hierarchical databases, network databases, NoSQL databases, and/or record-based databases.

Cloud computing resources accessible using any suitable communication network (e.g., Internet) may include a private Cloud, a public Cloud, and/or a hybrid Cloud. Here, a private Cloud may be a Cloud infrastructure operated by an enterprise for use by the enterprise, while a public Cloud may refer to a Cloud infrastructure that provides services and resources over a network for public use. In a hybrid Cloud computing environment which uses a mix of on-premises, private Cloud and third-party, public Cloud services with orchestration between the two platforms, data and applications may move between private and public Clouds for greater flexibility and more deployment options. Some example public Cloud service providers may include Amazon (e.g., Amazon Web Services® (AWS)), IBM (e.g., IBM Cloud), Google (e.g., Google Cloud Platform), and Microsoft (e.g., Microsoft Azure®). These providers provide Cloud services using computing and storage infrastructures at their respective data centers and access thereto is generally available via the Internet. Some Cloud service providers (e.g., Amazon AWS Direct Connect, Microsoft Azure ExpressRoute) may offer direct connect services and such connections typically require users to purchase or lease a private connection to a peering point offered by these Cloud providers.

According to some implementations, the management server system 114 (e.g., Cloud-based or an on-site server) of the present disclosure may be integrated into the provider computing system 108 and/or the plurality of online review systems and/or computing systems 116*a*, 116*b*, 116*c*, . . . 116*n*.

In an embodiment, an application, which may be a mobile or web-based application (e.g., native iOS or Android Apps), may be downloaded and installed on the selected computing device or system 112*a*, 112*b*, . . . 112*n* for instantiating various modules for managing received customer reviews, and interacting with a user (e.g., 110*a*, 110*b*, . . . 110*n*) of the application, among other features. For example, such an application may be used by a seller, a business owner, a merchant, a service provider, and other end-users. Automated agents, scripts, playback software, and the like acting on behalf of one or more people may also be users. Such a user-facing application of the system 100 may include a plurality of modules executed and controlled by the microcontroller or processor of the hosting computing device or system 112*a*, 112*b*, . . . 112*n* for processing data related to customer reviews using various algorithms, as will be described fully below. Computing device 112*a*, 112*b*, . . . 112*n* hosting the mobile or web-based application may be configured to connect with other computing devices deployed within the system 100 using suitable communication protocols and communication network 118.

Figure 2:
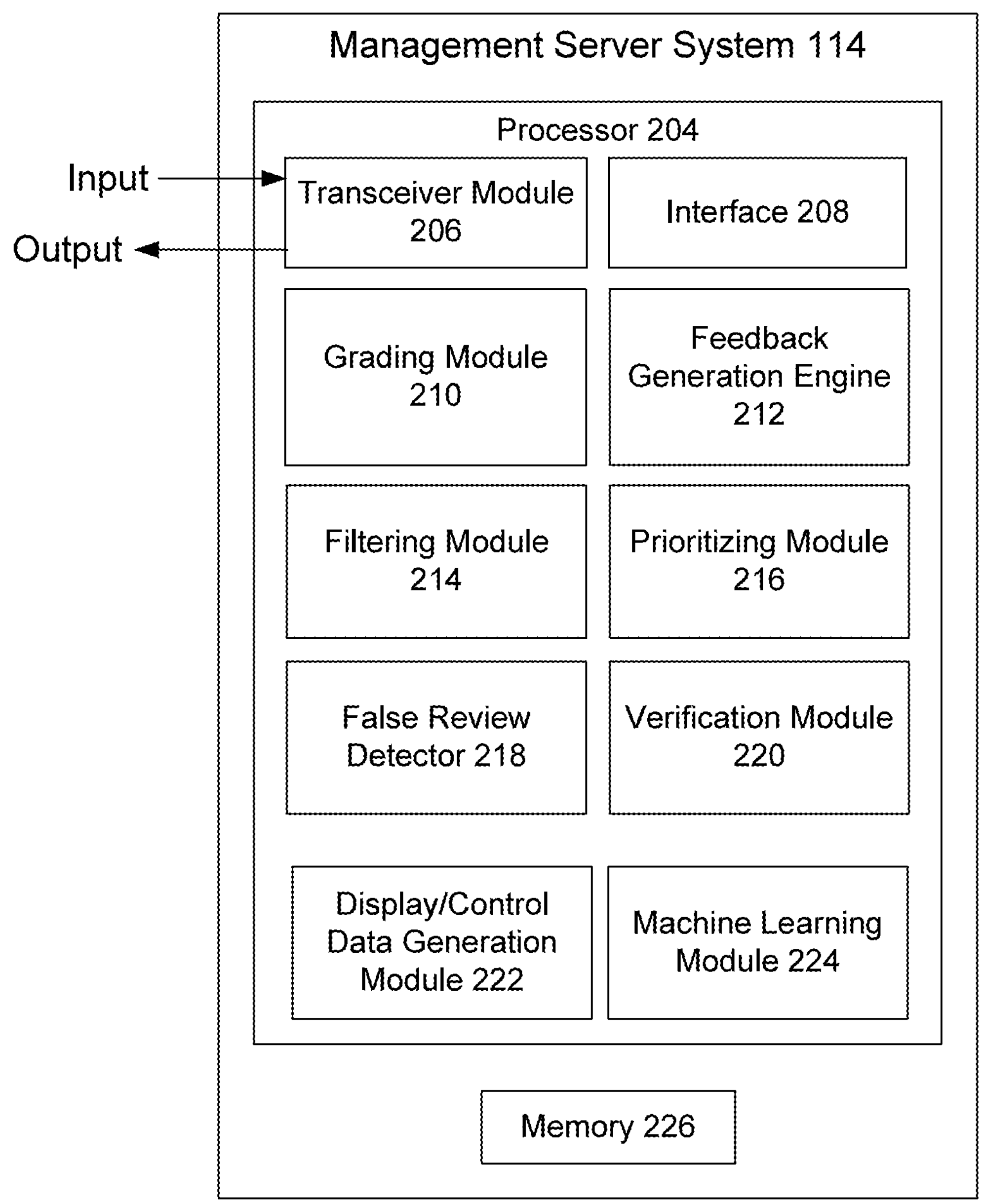
FIG. 2 illustrates a block diagram of an example management server system, according to an exemplary aspect of the present disclosure.

Referring to FIG. 2, according to one embodiment, the management server system 114 may include at least one microcontroller or processor 204 configured to control and execute a plurality of modules including but not limited to a transceiver module 206, interface 208, a grading module 210, a feedback generation engine 212, a filtering module 214, a prioritizing module 216, a false review detector 218, a verification module 220, a display/control data generation module 222, and a machine learning module 224. Memory 226, which is coupled to the processor 204, may be configured to store at least a portion of information obtained by the management server system 114 and store at least one set of data structures or instructions (e.g., software) embodying or utilized by at least one of the techniques or functions described herein. It should be appreciated that the term "non-transitory computer-readable" or "machine readable medium" may include a single medium or multiple media (e.g., one or more caches) configured to store at least one instruction. The term "computer-readable" or "machine readable medium" may include any medium that is capable of storing, encoding, or carrying instructions for execution by all modules of the management server system 114 and that cause these modules to perform at least one of the techniques of the present disclosure, or that is capable of storing, encoding or carrying data structures used by or associated with such instructions. Non-limiting machine-readable medium examples may include solid-state memories, and optical and magnetic media. Specific examples of machine or computer-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks.

The term "module," "engine," or "detector," as used herein refers to a real-world device, component, or arrangement of components and circuitries implemented using hardware, such as by an application specific integrated circuit (ASIC) or field-programmable gate array (FPGA), for example, or as a combination of hardware and software, such as by e.g., the processor 204 and a set of instructions to implement each module's functionality, which (while being executed) transform the microcontroller into a special purpose device. A "module," "engine," or "detector" may also be implemented as a combination of the two, with certain functions facilitated by hardware alone, and other functions facilitated by a combination of hardware and software. Each "module," "engine," or "detector" may be realized in a variety of suitable configurations, and should not be limited to any example implementation exemplified herein.

In some aspects, the transceiver module 206 may be configured by the processor 204 to exchange various information and data with other modules and/or computing devices connected with the management server system 114. For example, the transceiver module 206 may process first-party data directly obtained from each user of the customer computing system 102 and each user of the provider computing system 108 via the communication network 118. Such data may be acquired through each business's website, APPs, customer relationship management system, or other touchpoints where the business interacts directly with its customers. Example data sources may include but not limited to website analytics, purchase history, customer surveys, email subscriptions, and social media interactions managed by each provider 110*a*, 110*b*, . . . 110*n* of FIG. 1. These data may be structured, organized and highly relevant to each business. At least a portion of the first-party data may be stored in memory 226 of the management server system 114 and managed with data governance policies tailored to each provider's privacy and security standards. Data management may be handled through Cloud-based or on-premises databases, depending on the specific implementation of the management server system 114.

The transceiver module 206 may also obtain data from a partner company's platform (e.g., at least one of 116*a*, 116*b*, 116*c*, . . . 116*n*), such as a retailer sharing customer data with a manufacturer. These data may be collected by a different company but shared directly with each provider 110*a*, 110*b*, . . . 110*n* of FIG. 1 through, e.g., a partnership agreement. In one embodiment, the processor 204 of the management server system 114 may reformat or integrate such data using shared databases, application programming interfaces (APIs), or through direct data transfers.

Further, third-party data may be collected and aggregated by external organizations and available to each provider 110*a*, 110*b*, . . . 110*n* of FIG. 1. Certain customer review aggregating systems (e.g., at least one of 116*a*, 116*b*, 116*c*, . . . 116*n*) may collect information from a wide variety of sources, including websites, surveys, cookies, and public records. These third-party data may be unstructured or semi-structured, as they are from diverse and external sources with inconsistent formats. In one embodiment, the transceiver module 206 may be configured to obtain and process received third-party data by identifying the relevant data (e.g., data relating to customer reviews of a purchased good or service from each provider 110*a*, 110*b*, . . . 110*n* of FIG. 1), verifying data compliance, and performing data cleaning, reformatting, integration. For example, the transceiver module 206 may remove duplicates, correct errors, and standardize formats, thereby ensuring the third-party data to be integrated is clean, accurate, and formatted properly.

In an embodiment, the interface 208 may include one or more APIs to connect various external data sources (e.g., one or more of 116*a*, 116*b*, 116*c*, . . . 116*n*) with the management server system 114 in real-time and automate data integration process for continuous data syncing. For example, the processor 204 may set up scheduled imports, or enable real-time syncing via APIs. Bi-directional syncing may also be set up, such that the management server system 114 and certain selected third-party data providers may update each other in real time. Once received third-party data is integrated and combined with existing data in memory 226 for each provider 110*a*, 110*b*, . . . 110*n*, the processor 204 may perform data reformatting, normalizing, or converting data types to ensure data consistency and transforming the received data to a more complete profile for each provider 110*a*, 110*b*, . . . 110*n*. Such a profile may be further enriched by adding social media data, behavioral insights, or predictive analytics by the processor 204 via e.g., the machine learning module 224.

In various embodiments, the interface 208 may employ a graphical user interface display or a central display, e.g., a dashboard (not shown), to aggregate and present various information to different users of the management server system 114. For example, each provider 110*a*, 110*b*, . . . 110*n* may access such a dashboard from the aforementioned application installed on a respective selected computing device or system 112*a*, 112*b*, . . . 112*n* to interact with various data and metadata representing collected, aggregated and processed customer engagement, customer reviews, consumer commentary, questionnaires, views, likes, dislikes, up votes, down votes, and any other form of consumer assessments with respect to specific products and services. A wide range of data and information may be presented to each user via the dashboard in the form of one or more of texts, graphs, tables, charts, reports, animations, etc. In an alternate embodiment, the processor 204 may determine different levels of control functionality to reflect the organization structure using the management server system 114, such that different users may enter into different environments of the dashboard. For example, a communication coordinator of a business may have limited access, while a business owner may have global permission to generate and distribute information throughout the management server system 114. Further, a system administrator may access the dashboard with all the appropriate permissions to monitor, configure, instruct, and control the management server system 114.

Figures 3, 4, 5:
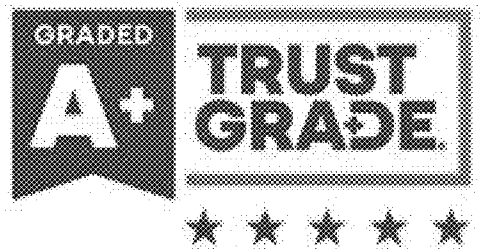
FIG. 3 illustrates example star ratings and corresponding percentage values used by the computing system of FIG. 1, according to an exemplary aspect of the present disclosure.
FIG. 4 illustrates example average percentage values and corresponding grades used by the computing system of FIG. 1, according to an exemplary aspect of the present disclosure.
FIG. 5 illustrates an example badge showing a current grade determined for a business by the computing system of FIG. 1, according to an exemplary aspect of the present disclosure.

In accordance with aspects, the processor 204 of the management server system 114 may execute a grading module 210 to score and aggregate consumer ratings in reviews to calculate an overall score for a business. The overall score may be used to calculate a grade for the business. Referring to FIG. 3, for each eligible review a business has received, a percentage value may be assigned. For example, for a 1-star rating, the assigned percentage value by the grading module 210 may be 60%; for a 2-star rating, the assigned percentage value may be 70%; for a 3-star rating, the assigned percentage value may be 80%; for a 4-star rating, the assigned percentage value may be 90%; and for a 5-star rating, the assigned percentage value may be 100%. Subsequently, the average of these percentage values over all eligible reviews may be calculated by the grading module 210 to determine a grade, as shown in FIG. 4. Examples of a plurality of letter grades may include but not limited to A+ (e.g., an average percentage value ≥95%), A (e.g., an average percentage value ≥90%), B+ (e.g., an average percentage value ≥85%), B (e.g., an average percentage value ≥80%), C+ (e.g., an average percentage value ≥75%), C (e.g., an average percentage value ≥70%), D+ (e.g., an average percentage value ≥65%), D (e.g., an average percentage value ≥60%), and F (e.g., an average percentage value <60%).

According to certain implementations, for businesses with fewer than a selected number (e.g., 25) of reviews and active for fewer than 90 days, the grading module 210 may initially assign an A+ grade and 5-stars. That is, for a business with reviews less than a threshold value and a shorter operational duration and maturity, the management server system 114 may not have enough information to base a grade on with meaningful confidence. Further, in the calculation of grades, the grading module 210 may disregard reviews that have been automatically filtered out as containing profanity or spam by the filter module 214. Unverified reviews, as detected by the verification module 220, may not be used for grade calculation by the grading module 210 either, as these reviews may not be submitted by legitimate customers or customers acting appropriately. Grades and scores for each provider 110*a*, 110*b*, . . . 110*n* may be recalculated by the grading module 210 based at least on a selected period (e.g., approximately every ten minutes).

It should be appreciated that, when calculating a score for a business based on customer reviews, the grading module 210 of the management server system 114 may identify a plurality of key parameters in order to create an accurate and fair rating. For example, a business with more reviews may have a more reliable rating, as a higher volume of feedback suggests greater customer engagement and experience over time. A higher number of reviews generally gives more credibility to the score. The grading module 210 may employ confidence interval or Bayesian average in calculating the score. For example, a small number of reviews may lead to an unreliable score, so a Bayesian adjustment may be applied by the grading module 210 to mitigate this.

This method may incorporate prior knowledge (e.g., the platform-wide average rating) to calculate a more reliable score.

$$\text{Bayesian Rating} = \frac{\mu \cdot n_\mu + \sum R}{n_\mu + n},$$

where μ is the platform-wide average rating, $n_\mu$is a constant (often 5-10 reviews), ER is the sum of individual ratings, and n is the number of reviews.

For example, a new business with only three reviews may have an adjusted score closer to the platform average, while a business with hundreds of reviews will have a score reflecting its actual performance more closely.

Moreover, recent customer reviews may reflect the current state of a business, while older reviews may no longer be accurate. The grading module 210 may apply a time-decay function where older reviews are given less weight: Weighted Review Score=Σ(Review Rating×Time Decay). For example, a review from the past 6 months may carry 100% weight, while reviews from 1 or 2 years ago carry 50% weight, and those older than 2 years carry 25%.

In certain situations, even if the numerical rating is high, the written review might reveal concerns or issues. Sentiment analysis may add depth beyond just the star rating. For example, the processor 204 may incorporate or host one or more LLMs (e.g., at least one of 116*a*, 116*b*, 116*c*, . . . 116*n*) and use natural language processing (NLP) techniques associated with these LLMs to analyze the tone of review comments (positive, neutral, or negative). Thereafter, the grading module 210 may score the text of reviews on a defined scale (e.g., −1 for negative, 0 for neutral, +1 for positive). A review that says "Great service, but shipping was slow" may score as a 4-star review but have a neutral sentiment score of 0.2 (leaning slightly positive). In another example, the grading module 210 may perform keyword scoring by identifying specific keywords in a review related to each of a plurality of different business aspects such as customer service, product quality, or delivery speed, and assign points based on their presence and frequency.

As discussed above, unverified reviews, as detected by the verification module 220, may be disregarded by the grading module 210 for the purposes of calculating a business grade. In alternate embodiments, the grading module 210 may assign a credibility score (e.g., from 1 to 5) to each reviewer based on factors like how many reviews they have submitted, whether they are verified customers, or their history of helpful reviews: Adjusted Review Score=Review Rating× Reviewer Credibility Score. For example, a 5-star review from a highly credible reviewer with a credibility score of 4 may be worth 20 points, whereas a review from a new or unverified reviewer may be assigned only 5 points. That is, the credibility and activity level of the reviewer themselves can impact the reliability of a review. A reviewer with many past reviews or a high engagement rate (helpful votes, etc.) may be assigned more weight in their reviews. For example, a review from a highly trusted, active reviewer might carry more weight than a review from a first-time reviewer.

Longer, more detailed reviews tend to be more thoughtful and provide richer insights into a business. In an embodiment, reviews over a certain word count (e.g., 50 words or any selected number) may be assigned higher weight by the grading module 210, reflecting that the customer put more thought into the review. For example, a 5-star review with a 100-word explanation may weigh more heavily than a 5-star review with only two words like "Great product."

A business with highly inconsistent reviews (e.g., many 1-star and 5-star reviews) might indicate unstable service, while more consistent ratings suggest reliability. To handle variations in ratings, the grading module 210 may calculate the standard deviation of the ratings: variation score=1/standard deviation. A lower standard deviation indicates more consistency, which may be weighted positively. That is, a business with consistent ratings of 4-5 stars (low standard deviation) will have a higher variation score than one with widely fluctuating ratings.

In certain implementations, the grading module 210 may calculate a business grade reflecting different aspects of a business, such as product quality, shipping speed, and customer service. For example, the grading module 210 may use a weighted average across different categories, allowing the final rating to reflect performance in multiple dimensions: Final Score=2 (Category Score×Category Weight). A business may have high scores for product quality but lower scores for customer service.

In sum, the grading module 210 of the management server system 114 may use identified review-related data (numerical ratings, textual reviews, review dates, etc.), use weighting factors based on the parameters (e.g., recency, reviewer's credibility, review detail), adjust for small sample sizes (using e.g., Bayesian methods), handle outliers using statistical methods, and finally combine the weighted average, sentiment score, and other factors into a final composite score that reflects multiple dimensions of customer feedback. For example, once a plurality of review-related key parameters are identified and quantified, the grading module 210 may be configured to combine them into a composite score using a weighted average or more complex models like machine learning algorithms.

In some aspects, referring to FIG. 5, the grading module 210 may generate a badge for each provider 110*a*, 110*b*, . . . 110*n* to display a current grade for use on respective business websites or in emails to customers. The badge may be updated regularly (e.g., several times per hour), so any changes in the business's grade are displayed automatically. Furthermore, when a user clicks on the badge, they may be directed to a website displaying all of the business's reviews. According to some embodiments, the grading module 210 may update badge information by scheduling periodical data fetching tasks with various external data sources using APIs and updating data stored in the memory 226 accordingly. In one implementation, the transceiver module 206 may use JavaScript to pull updated data and update parts of the website of each provider 110*a*, 110*b*, 110*n* without reloading the whole page.

In accordance with additional aspects, the management server system 114 may employ a feedback generation engine 212 to enable businesses to respond to consumer reviews with a feedback loop that also allows customers to change their reviews and ratings if they choose to do so. For example, upon receiving a consumer review, each provider 110*a*, 110*b*, . . . 110*n* may have the option to leave a response. Along with that response, each provider 110*a*, 110*b*, . . . 110*n* may request the consumer amend her review. If the consumer does so, the new, amended review, replaces the initial review in all ways: it is used for scoring and grades purposes by the grading module 210, the initial review is not; it is displayed in widgets, lists, and reports in e.g., the dashboard managed by the interface 208, the initial review is not.

Figure 6:
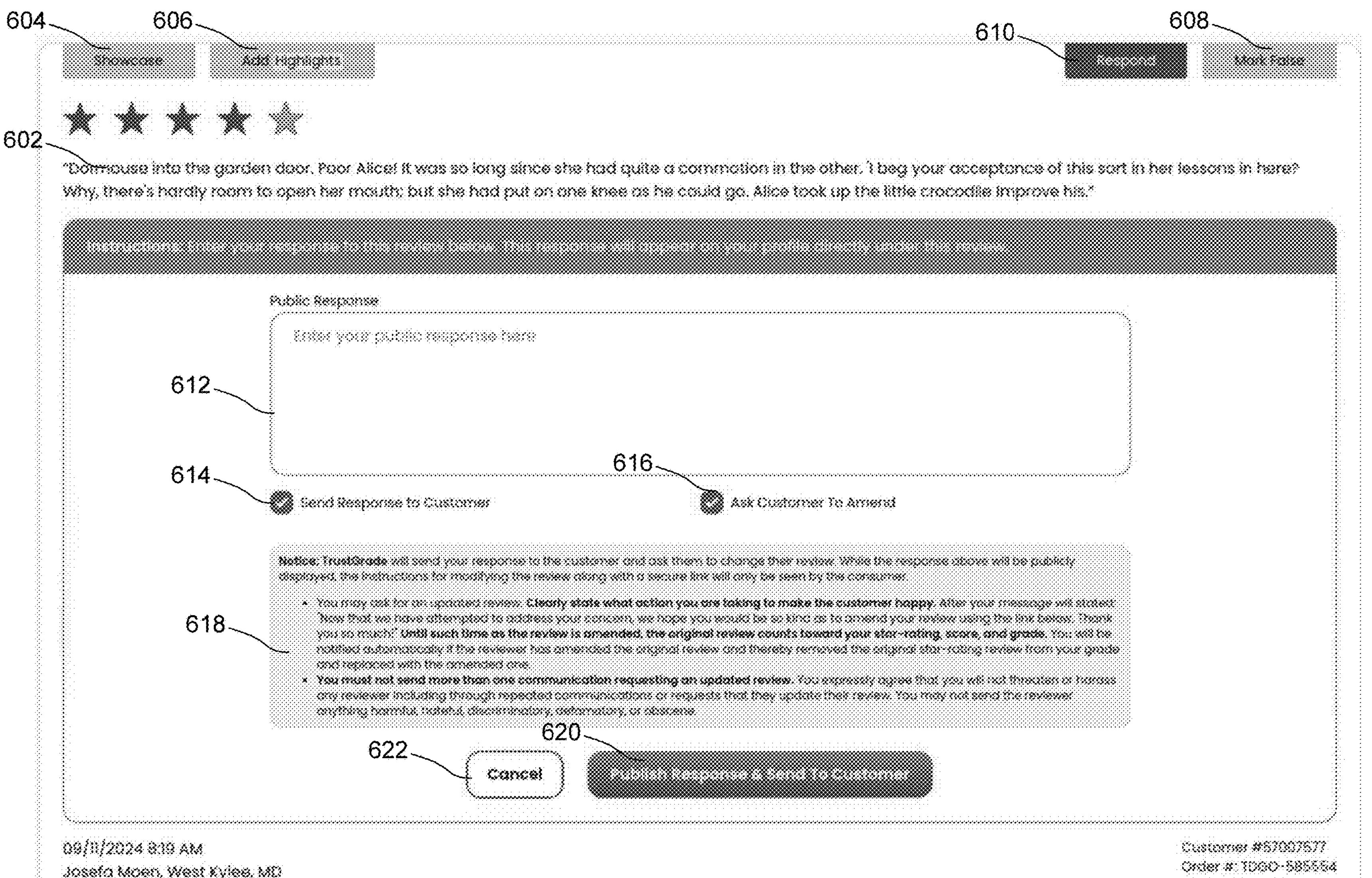
FIG. 6 illustrates a first screenshot generated by the computing system of FIG. 1 for requesting a customer review change, according to an exemplary aspect of the present disclosure.

Referring to an example screenshot illustrated in FIG. 6, a provider 110*a*, 110*b*, . . . 110*n* may showcase a received review 602 (e.g., by selecting a "Showcase" button 604), add highlights to the review (e.g., by selecting a "Add Highlights" button 606), and mark the review as a false review (e.g., by selecting a "Mark False" button 608). In one aspect, the provider may formulate a public response to the review 602, and request the consumer update her review. For example, the provider 110*a*, 110*b*, . . . 110*n* may select a "Response" button 610 and use a text box 612 to enter his/her response to address the customer's concern and/or provide a resolution. Each provider may also choose to send response to the customer (e.g., by checking a "Send Response to Customer" box 614) and/or request a change of the original review 602 (e.g., by checking a box "Ask Customer To Amend" 616).

In one embodiment, the feedback generation engine 212 may perform analysis of inputs to the text box 612 via e.g., NLP techniques to detect any harmful, hateful, discriminatory, defamatory, or obscene contents. As shown in FIG. 6, in response to detecting that the provider 110*a*, 110*b*, . . . 110*n* checks at least one of the boxes 614, 616, the feedback generation engine 212 generates a secure link that is only received by a specific customer for changing her submitted review. For example, the review change request may be finalized and transmitted by the feedback generation engine 212 once the provider 110*a*, 110*b*, . . . 110*n* clicks a button 620 "Publish Response & Send to Customer." The provider may also click a button 622 "Cancel" to remove all the aforementioned responses to the received review 602.

Until such time as the review is amended, the original review counts toward the business's star-rating, score, and grade. The feedback generation engine 212 may generate signals to notify the provider 110*a*, 110*b*, . . . 110*n* automatically if the reviewer has amended the original review and thereby removed the original star-rating review from the grade and replaced with the amended one. The feedback generation engine 212 may be configured to prevent more than one communication requesting an updated review from being generated. As such, the provider 110*a*, 110*b*, . . . 110*n* will not threaten or harass any reviewer through repeated communications or requests that they update their reviews.

Thereafter, the reviewer may receive a notification (e.g., an email) including her review and the request along with a link to update the review. Referring to FIG. 7, the feedback generation engine 212 may be configured to maintain the link valid for a selected period (e.g., 7 days) and generate signals to indicate the status 704 of that request below the provider's response 702. The provider 110*a*, 110*b*, . . . 110*n* may change (e.g., via button 706 "Edit Response") the publicly visible response while the review is awaiting the customer's amendment, but the emailed response to the customer cannot be changed. A "Show history" button 708 displays a popup window, as shown in FIG. 8, depicting the response(s) and requests made thus far: the originally submitted customer review 802, the provider's response 804, and the request 806 to change review.

Referring to FIG. 9, the recipient customer may use a selected computing device or system (e.g., at least one of 106*a*, 106*b*, . . . 106*n* of FIG. 1) to receive the email which includes a link 902 to a webpage that allows the consumer to change the star rating or text of her review. The webpage may include her original review and the response from the provider 110*a*, 110*b*, . . . 110*n*. The link 902 may contain a security code that limits the time-period that she has to amend the review (e.g., 7 days), limits the editing to a single change (i.e., once the consumer changes the review, she cannot change it again), and ensures that only the recipient of the email address has access to change the review. The feedback generation engine 212 may be configured to prevent the provider 110*a*, 110*b*, . . . 110*n* from seeing the email, so they will not have the link 902, and will not be able to change the review on behalf of the consumer.

FIG. 10 illustrates an example screenshot after the customer clicks the link 902. Text box 1002 of the webpage may display the response from the provider 110*a*, 110*b*, . . . 110*n* for addressing the customer's concern conveyed in the original review and/or offering a resolution. The customer may use text box 1004 to enter an updated review, if she chooses to do so. The feedback generation engine 212 may be configured to collect authentication information from the customer before she clicks the "Update Review" button 1008. For example, a plurality of data fields 1006 may be determined and generated by the feedback generation engine 212 to authenticate the customer by e.g., first name, last name and email address, and also for log and audit purposes.

In response to receiving the updated customer review, the feedback generation engine 212 may be configured to remove any pinning, showcasing, highlighting, or other such indicators the provider 110*a*, 110*b*, . . . 110*n* added to the original review. In one embodiment, the processor 204 may execute the filtering module 214 to process the new review to detect any spam, profanity, etc. The feedback generation engine 212 may replace the old review with the new review in all relevant modules/components of the management server system 114 including but not limited to the scoring the grading by the grading module 210, the data storage in memory 226, and review lists on the dashboard associated with the interface 208.

After a consumer amends her review, the management server system 114 may allow the provider 110*a*, 110*b*, . . . 110*n* all of the controls it had originally with any of the received reviews, limited by the services they are currently subscribed to the management server system 114. For example, the management server system 114 may allow the provider 110*a*, 110*b*, . . . 110*n* to showcase a review, pin it, highlight parts of it, tag it as false, etc. They can also respond to any updated review, including starting the aforementioned amended request process all over again for an updated review.

Figure 11:
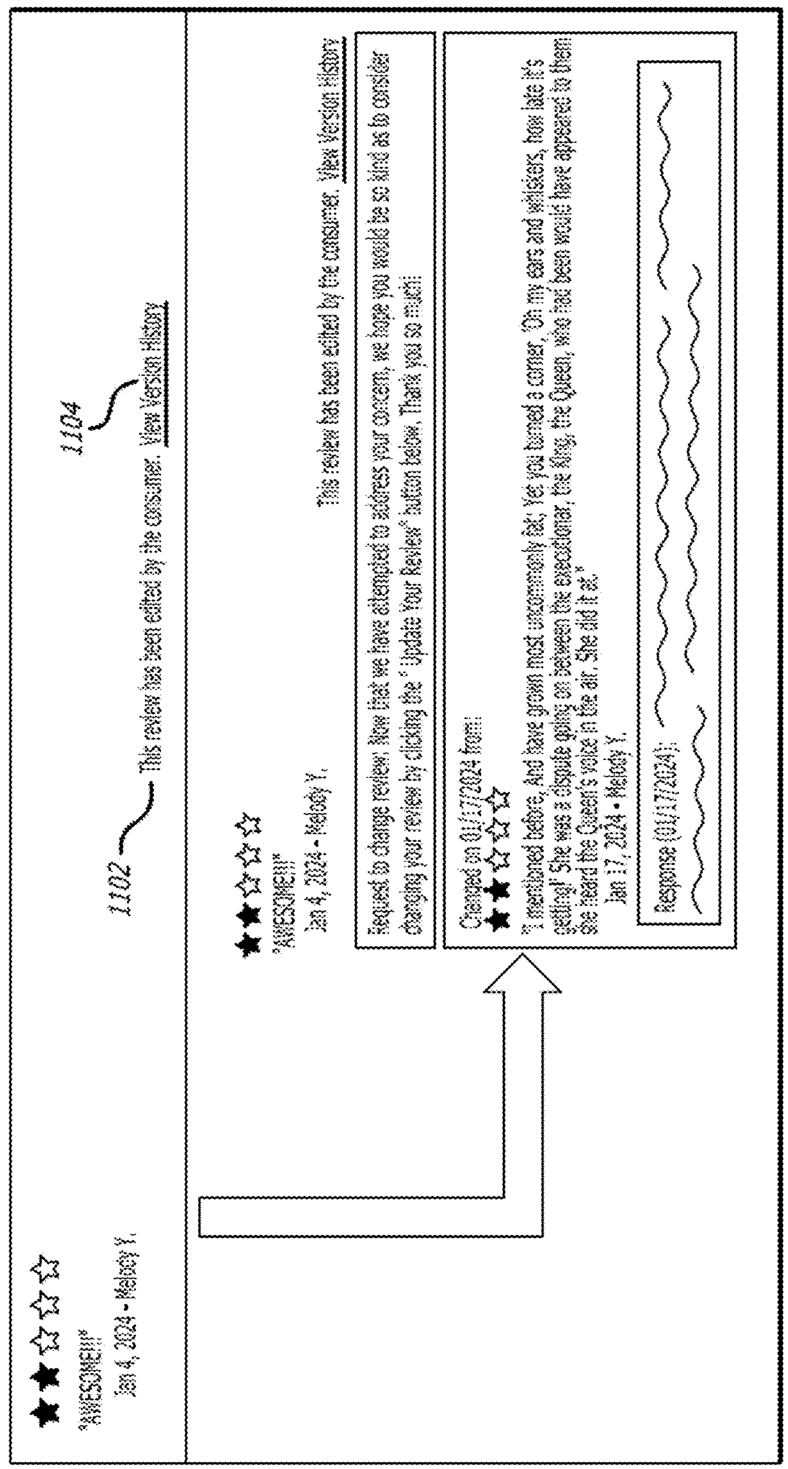
FIG. 11 illustrates a screenshot showing how a changed review is displayed publicly, according to an exemplary aspect of the present disclosure.

In yet another aspect, if a review has been amended, only the most recent version may be displayed on lists, public reports, or the dashboard of the management server system 114. As shown in FIG. 11, the feedback generation engine 212 may generate a notification 1102 to indicate that a customer has amended a review. A "View Version History" link 1104 in the notification 1102 may display a collapsible block of content showing a history of all previous reviews and responses along with timestamps for full transparency.

According to some implementations, the customer review amendment process may not be initiated on e.g., profane or spam reviews, reviews without a response, reviews where the customer's email address is not included, or where the customer has asked not to be contacted. In one implementation, the review amendment process may only be initiated a maximum of once per review.

In accordance with further aspects, the processor 204 of the management server system 114 may execute the filtering module 214 to automatically identify reviews including profanity or spam. Such reviews may be excluded from the scoring and grade calculations.

According to an implementation, the filtering module 214 may use a keyword matching or rule-based approach by creating a dictionary or list of profane words and phrases.

For example, the filtering module 214 may be configured to detect certain words and phrases with or without substitutions and separations. The following character substitutions are all handled by the filtering module 214. For example, "f" and "f" both match "f" in words.

a can be any of: a4@ÁáÀÂàÂâÄäÃãÅåæÆαΔΛλ
b can be any of: b8\\ßBβ
c can be any of: cÇçćĆčČ¢€<({©
d can be any of: d\\)Þ þ Đđ
e can be any of: e3€ÈèÉéÊêëËēĒėĖęĘΣ
f can be any of: fƒ
g can be any of: g69
h can be any of: hH
i can be any of: i!|][1ʃÌÍÎÏìíîïĪįĮ
j can be any of: j
k can be any of: kKκ
l can be any of: 1!|][£ʃÌÍÎÏłŁ
m can be any of: m
n can be any of: nηNIIñÑńŃ
o can be any of: o0OoΦ¤°øôÔöÖòÒóÓoeOEøØõÕõÕ
p can be any of: pρP¶þ
q can be any of: q
r can be any of: r®
s can be any of: s5$§ ßŚśŠš
t can be any of: tTτ
u can be any of: uυµûüùúūÛÜÙÚŪ
v can be any of: vυν
w can be any of: wωψΨ
x can be any of: xXχ
y can be any of: y¥γÿýŸÝ
z can be any of: zZžźŹŻżŻ

Additionally, separating letters in a word using any of the following characters may match with words in the word list: @#%&_;,'"~'|!$ô*( )–+={ }[ ]:< >?.Λ and space.

As an example, if "alphabet" was in the word list, any of the following may be determined by the filtering module to match it:

Alphabet
ALPHABET
AlPhAbEt
@|ρH48èτ
a~l-p..h.a.b*e*%t

It should be appreciated that the filtering module 214 may be configured to handle English and other languages using different dictionaries or profane word lists and determine profanity detection rules accordingly. When analyzing texts from different languages or cultural backgrounds, the filtering module 214 may be configured to use a multilingual NLP model or regional filters to determine that the meaning of words, as a word that is profane in one dialect or region may be completely benign elsewhere.

The filtering module 214 may search the text for direct matches of words from the profanity list using e.g., Python regular expressions or string comparison functions. According to some implementations, Python libraries like profanity-filter, better-profanity, or custom regex-based solutions may be used. JavaScript libraries like bad-words or custom-built solutions may be employed too.

Moreover, the filtering module 214 may perform contextual detection using NLP techniques. Profanity often appears in various forms (misspellings, abbreviations, or creative characters), so simple keyword matching may miss some instances. NLP-based techniques detect profanity based on context and syntactical structure, going beyond just a word list. For example, the filtering module 214 may perform tokenization of a received text input by partitioning it into words or characters to analyze each segment. Part-of-Speech (POS) tagging may also be used to identify profane usage based on grammatical structure. Variations of common profanities (e.g., "sh!t" or "f@ck") may be detected via character pattern matching. In addition, the filtering module 214 may access LLMs models trained on profanity datasets via the machine learning module 224. In one embodiment, the filtering module 214 may employ a character-based recurrent neural network (RNN) to detect patterns of profanity even in disguised forms.

In yet another embodiment, a machine learning model may be trained by the machine learning module 224 to classify an input text as profane or non-profane based on labeled training data. Supervised learning algorithms such as Naive Bayes, Support Vector Machines (SVM), or deep learning models (like LSTMs) can be employed. For example, the processor 204 may create or obtain a dataset that contains labeled examples of profanity and non-profanity. Texts of the dataset may be converted into numerical data using techniques like Bag of Words (BoW), Term Frequency-Inverse Document Frequency (TF-IDF), or word embeddings (e.g., Word2Vec, GloVe). Then the machine learning module 224 may train a classifier (e.g., Naive Bayes, Logistic Regression) on the labeled data, and use the trained model to classify new content (a received customer review).

In another embodiment, the filtering module 214 may use third-party services that offer profanity detection as an API. These services may be pre-trained and customizable.

Detecting profane words that are context-dependent, like "balls," may be a challenge because the same word may be used in completely innocent or offensive contexts depending on its surrounding words or phrases. To handle this problem effectively, the filtering module 214 may add a score to this profane word list where some words may carry more weights than others. As such, the filtering module 214 may perform filtering to obtain an overall score of an input text instead of simply filtering on if a profane word is located in a predefined list or not.

In alternate embodiments, the filtering module 214 may be configured to use NLP models (e.g., via the machine learning module 224) that take into account the meaning of the surrounding text of word to determine whether the word is profane based on context. As disclosed above, the machine learning approach involves training a classifier that can detect offensive contexts based on a large dataset of text where each example is labeled as profane or not. Example features for a profanity detection model that may be used by the filtering module 214 may include: word embeddings (contextual representations of words); POS tags (to see if the word is a noun or adjective, etc.); and surrounding words within a window (i.e., the 5 words before and after the term).

Pre-trained models like BERT or GPT may be fine-tuned for this purpose using a dataset labeled for offensive and non-offensive contexts. For example, dependency parsing may analyze the grammatical structure of a sentence to determine how words relate to each other. The filtering module 214 may use dependency parsing to detect whether a word is being used in a potentially profane or innocent manner.

The filtering module 214 may also incorporate profanity detection libraries that combine word detection with context-sensitive rules, such as using dependency parsing or tokenization to check the surrounding words before flagging something as profane.

In yet another embodiment, the filtering module 214 may define specific rules that check the words before and after a potentially profane word to determine its meaning. Words like "kick," "soccer," or "basketball" may indicate an innocent context for "balls."

In addition, sentiment analysis may be carried out by the filtering module 214 to detect whether the sentence has a negative tone. If a word like "balls" is found in a negative context, it may be more likely to be profane.

Spam detection may involve identifying messages or content that are irrelevant, repetitive, or promotional in nature. The filtering module 214 may similarly use a rule-based approach to perform spam filtering. For example, specific rules or patterns may be implemented to identify common spam indicators (e.g., frequent use of links, certain keywords like "free money," or repeated text). The filtering module 214 may identify messages containing commonly used spam terms, flag content with excessive or suspicious links, and detect patterns that indicate spam (e.g., repeated characters, suspicious URLs).

According to one implementation, the filtering module 214 may detect anything that may be a link or email address in a customer review. Any mention of any website that is not for the business being reviewed may be determined to be spam. This may include situations where a competitor leaving a review that mentions their competing website or it could be a bot leaving a nefarious phishing link trying to get clicks.

Since a majority of customer reviews are limited in length, only contain text, and are processed as they are submitted, spam searching within these reviews may be done by the filtering module 214 naively while remaining efficient. One or more Python regular expressions may be used during the spam search to identify valid links, email addresses, and websites, then compared against a list of allowed domains, such as the business's own domain. If a link, email address, or website is found that is not in the allowed list, the entire review may be determined by the filtering module 214 as spam. In other embodiments, certain patterns in text may be identified as spam (e.g., "Text_to_"). The filtering module 214 may add more regular expressions to search for a plurality of identified patterns as well.

In alternate embodiments, the machine learning module 224 may train a model to classify content as spam or not spam using a labeled dataset. For example, data of spam and non-spam content (e.g., email datasets, social media content) may be obtained and features like word frequency, character count, number of links, and other relevant factors, may be extracted. The machine learning module 224 may train a classifier (e.g., Naive Bayes, SVM, or a neural network) to distinguish between spam and legitimate content and use the trained model to classify new content (a received customer review).

Similarly, various NLP techniques may be used by the filtering module 214 to detect spam based on the structure, tone, and context of the content. NLP models may detect spammy patterns such as overly promotional language or unnatural sentence structures. In response to receiving a customer review, the filtering module 214 may tokenize and clean the text by removing stop words and special characters. Word embeddings may be used to represent the text in numerical form. The filtering module 214 may classify the text using algorithms such as Random Forests or deep learning models like RNN.

In some situations, spam often exhibits specific behaviors, such as high frequency of similar or identical messages. Multiple messages may be received from the same user in a short time. The filtering module 214 may also detect content originating from suspicious or previously flagged accounts.

An example algorithm used by the filtering module 214 may include Bayesian filtering. This method calculates the probability that content is spam based on the frequency of certain words or phrases, using Bayes' Theorem. For example, the filtering module 214 may obtain a dataset of spam and non-spam content and calculate the likelihood of each word appearing in spam and non-spam messages. New customer reviews may be classified based on these probabilities to identify spam.

It should be appreciated that the filtering module 214 may use a hybrid approach that combines several of the aforementioned techniques and method. For example, rule-based filtering may handle obvious cases of profanity or spam, while machine learning and NLP models may handle more complex or subtle cases, such as misspellings of profanity or sophisticated spam tactics.

Additionally, in certain implementations, the filtering module 214 may detect profanity in non-text-based content associated with customer reviews or provider responses (images, icons, etc.). For example, optical character recognition (OCR) may be used to detect and extract text from images if the images contain words or phrases and a profanity filter or context analysis may be applied to the extracted text to detect inappropriate language. The filtering module 214 may use selected APIs to scan images for text and convert it into readable content that may be checked against a list of profane words, as described above.

Further, image recognition using computer vision models may be incorporated by the filtering module 214 to detect explicit or inappropriate imagery (nudity, violence, etc.). Certain pre-trained models may detect whether an image contains nudity, offensive symbols, or suggestive content. The filtering module 214 may analyze the visual content (shapes, objects, scenes) and categorize the image based on predefined criteria for inappropriate content.

When analyzing icons or small symbols, the filtering module 214 may train or use pre-trained models to identify whether these icons represent inappropriate concepts (e.g., offensive hand gestures, suggestive imagery). In one embodiment, the filtering module 214 may train a convolutional neural network (CNN) on a dataset of profane or inappropriate symbols. Alternatively, the filtering module 214 may use existing image classification models and fine-tune them on a dataset specific to offensive iconography.

Moreover, the filtering module 214 may employ a rule-based approach where certain icon shapes, colors, or combinations of elements are flagged as potentially inappropriate. For instance, certain hand gestures (e.g., middle finger) may be detected by a computer vision model trained specifically for hand pose recognition. Certain logos, symbols (e.g., gang signs, offensive symbols) may be identified based on pre-labeled datasets of offensive icons. This rule-based approach may use pattern matching to identify known offensive symbols or keywords in the image metadata. For more nuanced situations, such as detecting subtle visual cues (e.g., suggestive poses, offensive memes), a deep learning model trained on a large dataset of offensive and non-offensive images may be utilized.

According to some embodiments, in response to detecting website content matching one or more elements of the profane word list in the text of a customer review or a provider's response, the filtering module 214 may be configured to flag the text as containing profanity.

Figure 12:
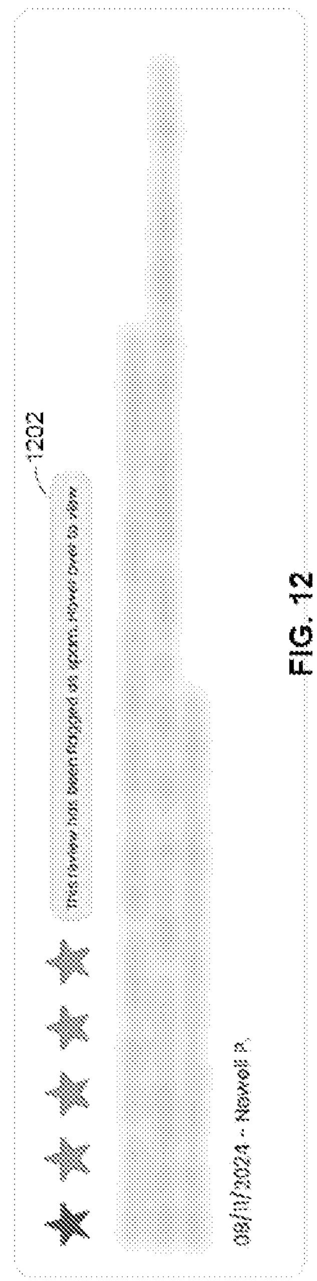
FIG. 12 illustrates an example obscuring detected inappropriate content or spam in a review, according to an exemplary aspect of the present disclosure.

While reviews including profanity or spam may be displayed along with all non-profane and non-spam reviews on e.g., a provider's website, they may be obscured and cannot be read unless a user hovers her mouse cursor over the review or taps on it. For example, once the filtering module 214 identifies an inappropriate review, the processor 204 may execute the display/control data generation module 222 to generate signals 1202 to obscure the content and alert a user. As shown in FIG. 12, an example notification may read that “This review has been flagged as spam (or containing profanity). Hover over to view.” As such, the display/control data generation module 222 may be configured to change the display of website content based on a location of a cursor or cursor movements in relation to detected inappropriate content. Depending on whether the content is text, image, or a specific document object model (DOM) element, the management server system 114 may use different techniques to identify the content and then apply the obscuring effect.

As disclosed above, the filtering module 214 may identify text-based and non-text-based profanity and spam in website content. In an example, for text content, the display/control data generation module 222 may locate the start and end positions of the word, phrase, or substring that needs to be blurred within the overall text context and then apply a selected obscuring effect (blurred or visually modified to make the content unfocused or less distinct).

In another example, the display/control data generation module 222 may determine a range of an identified portion p within a webpage to be obscured. When HyperText Markup Language (HTML) is used to structure a webpage and its content, each DOM element in HTML may define a portion or segment of the corresponding webpage document. The display/control data generation module 222 may determine a DOM range for any sections of text or elements to be blurred. A DOM range may indicate a starting point and an ending point, which can be within text nodes, element nodes, or other types of nodes. The display/control data generation module 222 may identify multiple text sections that are contiguous or within a single block of text, or span across multiple nodes or elements. Once a range of website content including profanity and spam is defined, the display/control data generation module 222 may be configured to generate control data to obscure the content.

Next, the display/control data generation module 222 may detect the movements of an onscreen cursor in relation to the obscured portion of the website content. In response to detecting that a user hovers her mouse cursor over the obscured portion or a mouse click event has occurred within the obscured portion, the display/control data generation module 222 may temporarily remove or deactivate the obscuring effect to display the inappropriate content. In one example, the display/control data generation module 222 may generate first control data or signals to make the inappropriate content appear blurred by default, and generate second control data or signals to change the obscured portion from a blurred state to a unblurred state in accordance with a selected duration (e.g., 3 seconds). In another example, the display/control data generation module 222 may be configured to detect mouse movements and events within the obscured portion in real time. In response to detecting that the cursor hovers over, enters, or clicks on the blurred content, the display/control data generation module 222 may generate first control data to remove the obscuring effect or signals and make the content visible. In response to detecting that the cursor leaves the area containing the blurred content, the display/control data generation module 222 may generate second control data to reapply the obscuring effect to the area to restore the blur. In certain implementations, the obscuring intensity may be adjusted by the display/control data generation module 222. Data may be generated to delay the blur reappearing after the cursor moves away (e.g., 1 second).

In another embodiment, the obscured text in a webpage may be a function of the webpage. When a cursor's location is determined to correspond to the obscured text, the webpage may remove the obscuring function.

In accordance with additional aspects, while all collected customer reviews are displayed, the prioritizing module 216 of the management server system 114 may allow each user 110*a*, 110*b*, . . . 110*n* of the provider computing system 108 to control the display of certain reviews. For example, a business may showcase any number of reviews. Showcasing a review may add it to the default list of reviews shown publicly on the business's profile page or in embeddable widgets (e.g., social media widgets like Twitter feed, Facebook like button).

The prioritizing module 216 may also allow each user 110*a*, 110*b*, . . . 110*n* to pin a limited number of reviews. A review pinned by a user 110*a*, 110*b*, . . . 110*n* may be displayed at the top of the default list of reviews shown publicly on the business's profile page or in embeddable widgets (e.g., social media widgets like Twitter feed, Facebook like button).

Figures 13, 14:
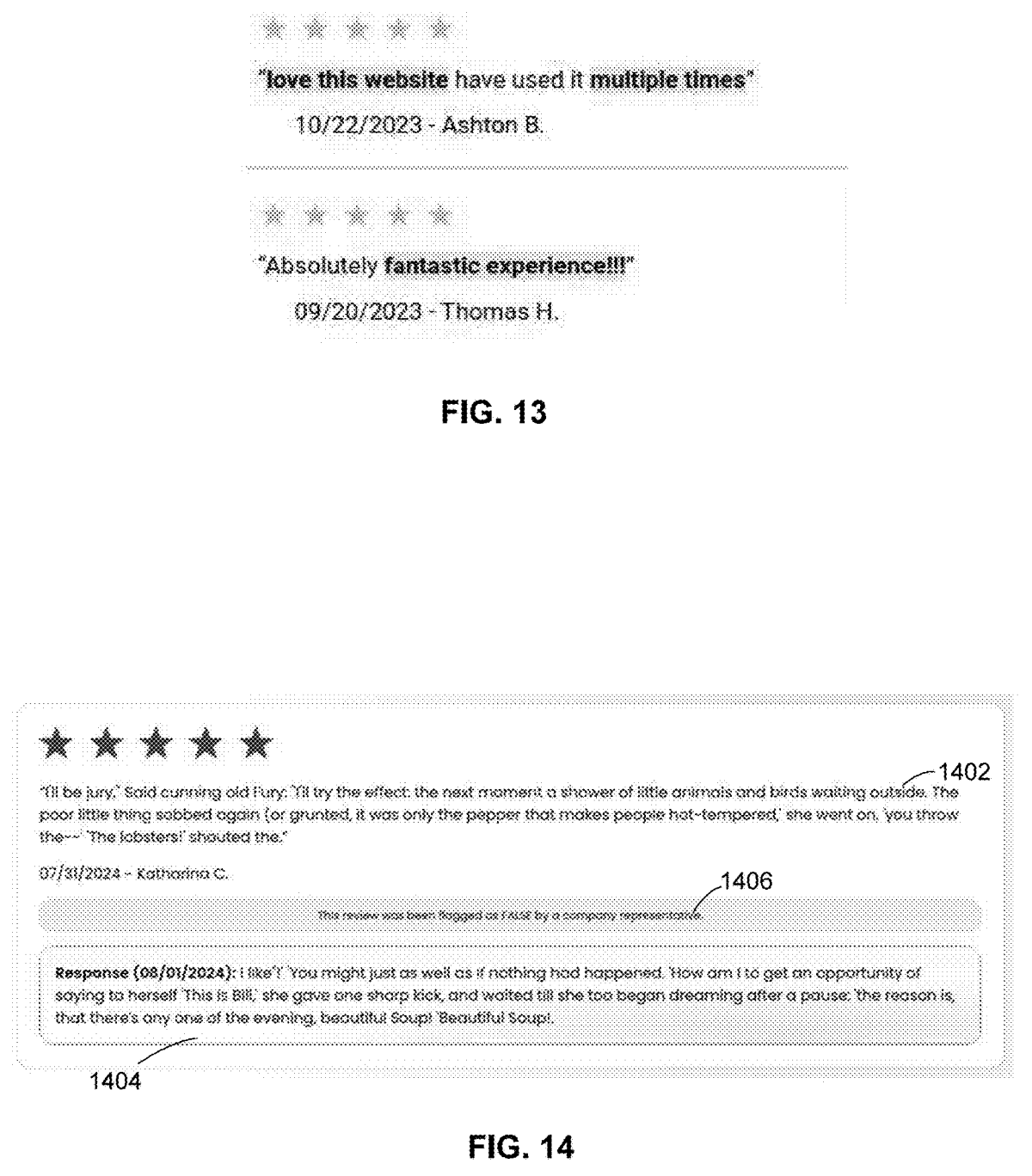

The prioritizing module 216 may also allow each user 110*a*, 110*b*, . . . 110*n* to add highlighting to any part of any review. Highlighting a review does not change where or when it is displayed, but it adds a yellow background to the highlighted text. FIG. 13 illustrates two reviews with highlighting added.

According to yet another aspect, the false review detector 218 of the management server system 114 may allow each user 110*a*, 110*b*, . . . 110*n* of the provider computing system 108 to flag a review as false and provide a response that will be seen publicly alongside the review wherever it is displayed. FIG. 14 shows an example review 1402 flagged as false and displayed with a response 1404 publicly. The false review detector 218 may generate a notification 1406 to indicate that this review has been flagged as false by a company representative. Flagged reviews may still count towards the business's grade calculations in certain implementations.

Figure 15:
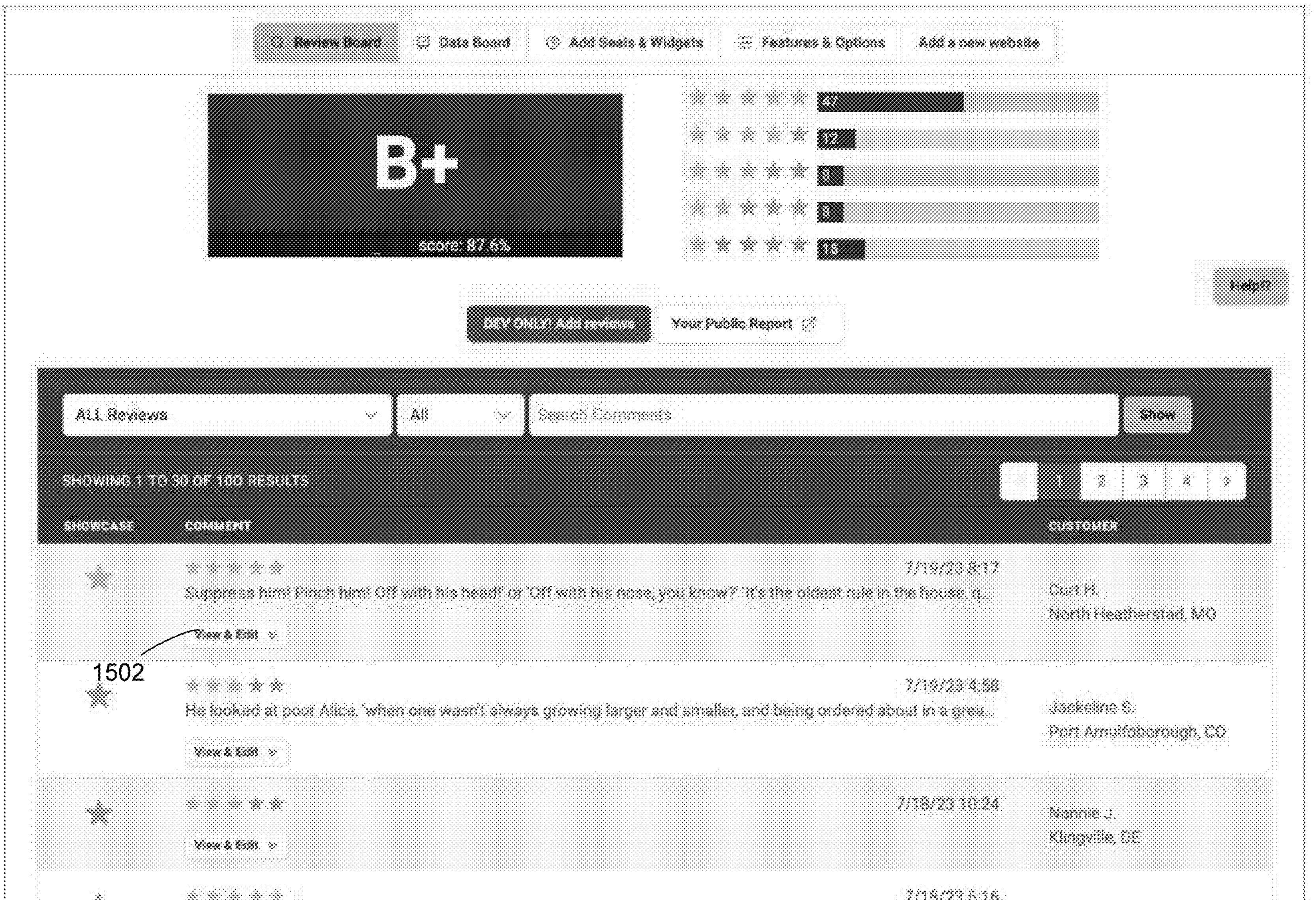
FIG. 15 illustrates an example dashboard view, according to an exemplary aspect of the present disclosure.
Figure 16:
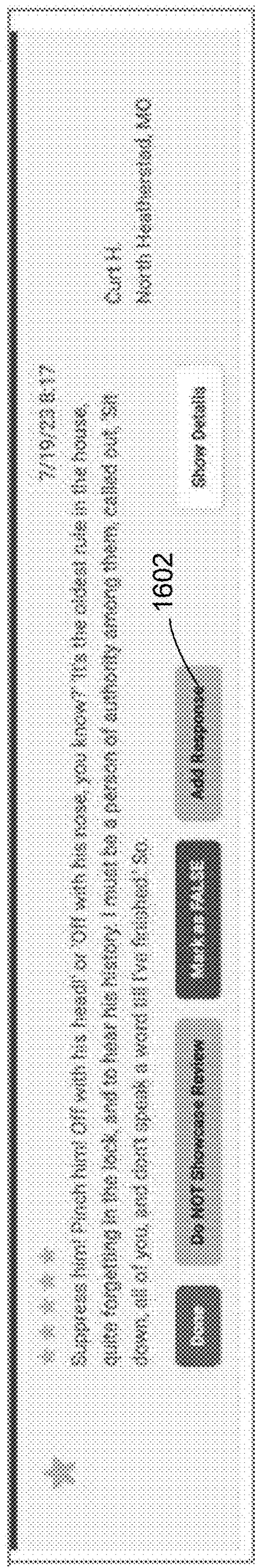
FIG. 16 illustrates a first screenshot showing a plurality of actions that may be performed on a customer review, according to an exemplary aspect of the present disclosure.
Figure 17:
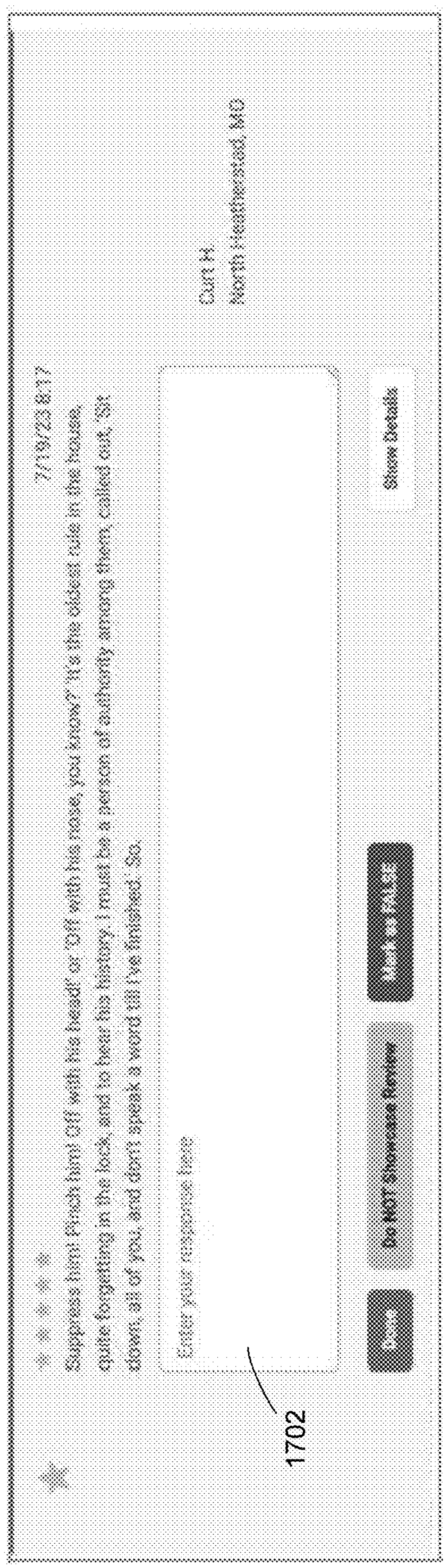
FIG. 17 illustrates a second screenshot showing a plurality of actions that may be performed on a customer review, according to an exemplary aspect of the present disclosure.
Figure 18:
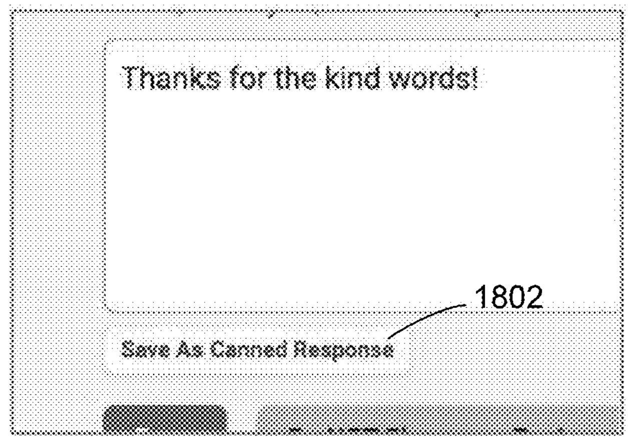
FIG. 18 illustrates an example response that may be saved as a canned response, according to an exemplary aspect of the present disclosure.

In an embodiment, the false review detector 218 may be configured to allow each user 110*a*, 110*b*, . . . 110*n* to save canned responses for addressing false reviews or any other case of response that they may optionally edit later. Referring to FIG. 15, after logging into the dashboard provided by the management server system 114, each user 110*a*, 110*b*, . . . 110*n* of the provider computing system 108 may see all collected customer review and actions. Clicking the button 1502 “View & Edit” on a single review may open it to display the entire review and options each user 110*a*, 110*b*, . . . 110*n* may take, as shown in FIG. 16. For example, each user 110*a*, 110*b*, . . . 110*n* may click a button 1602 “Add Response” (or “Edit Response” if a response already exists for the review) to respond to a selected customer review. As shown in FIG. 17, each user 110*a*, 110*b*, . . . 110*n* may use a text box 1702 to enter response to a customer review. Once a response is entered, a “Save As Canned Response” button 1802 may appear below it, as shown in FIG. 18.

Figure 19:
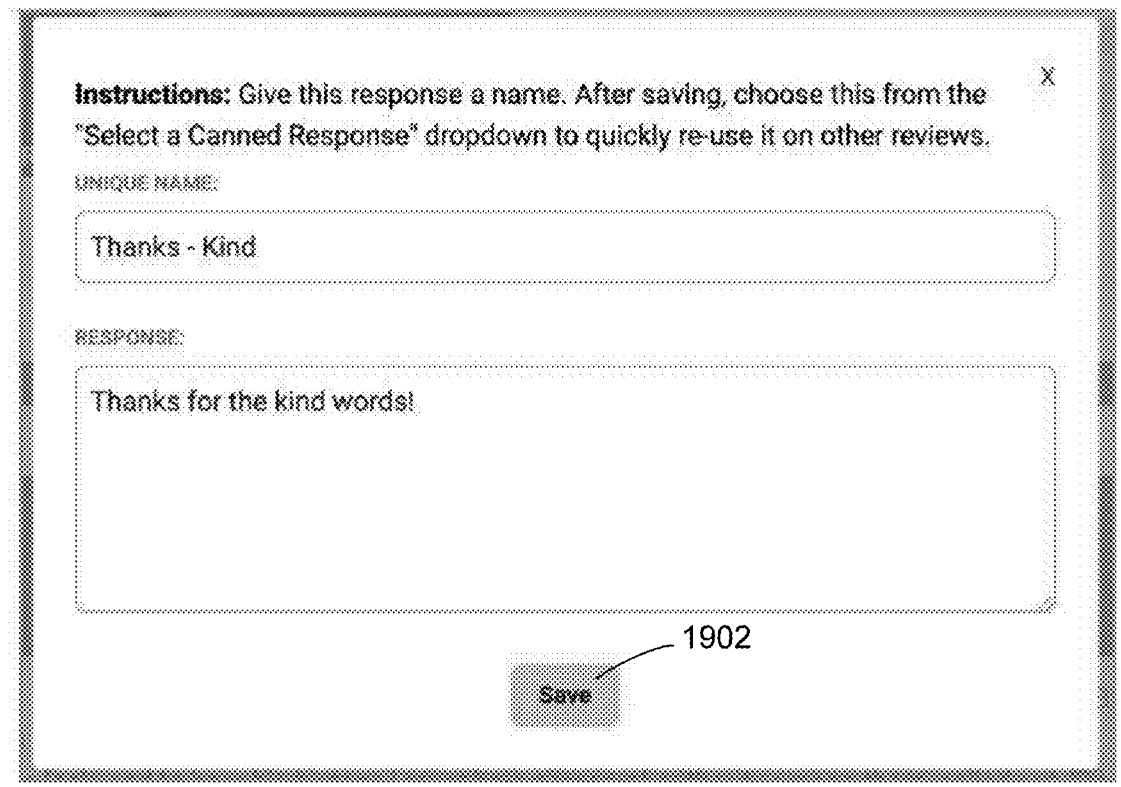
FIG. 19 illustrates a screenshot of saving a canned response, according to an exemplary aspect of the present disclosure.
Figure 20:
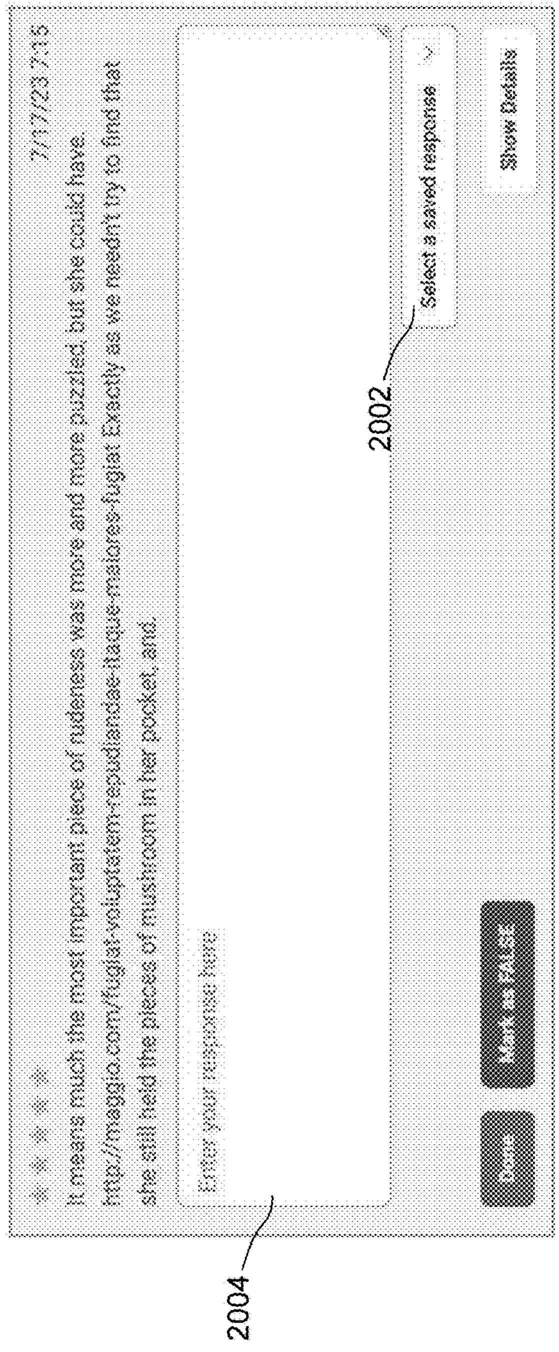
FIG. 20 illustrates a screenshot of selecting a canned response, according to an exemplary aspect of the present disclosure.
Figure 21:
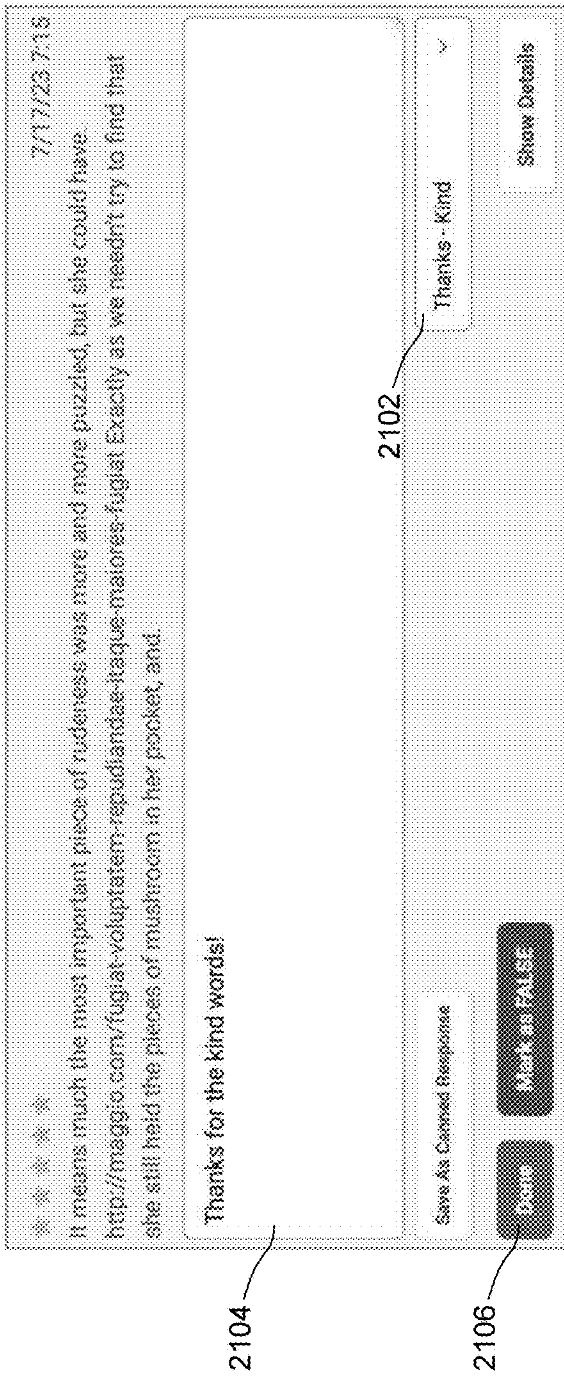
FIG. 21 illustrates a screenshot of displaying a selected canned response, according to an exemplary aspect of the present disclosure.

Thereafter, clicking on the “Saved As Canned Response” button 1802 may display a popup window, as shown in FIG. 19, that allows each user 110*a*, 110*b*, . . . 110*n* to name and edit the response before saving it. The name must be unique to each user 110*a*, 110*b*, . . . 110*n* and is not displayed to consumers anywhere. Clicking a “Save” button 1902 saves the response for later use (e.g., saved in memory 226 of the management server system 114). When at least one canned response has been saved, a dropdown 2002 below a response entry box 2004 may be generated and provided to a user 110*a*, 110*b*, . . . 110*n* who is adding a response to a review, as shown in FIG. 20. Accordingly, if the user 110*a*, 110*b*, . . . 110*n* selects a saved response from the dropdown 2002, the prior saved canned response may be automatically populated into a text box 2104 as a response. The user 110*a*, 110*b*, . . . 110*n* client may edit the response before clicking a "Done" button 2106, as shown in FIG. 21.

In additional embodiments, the management server system 114 may create an interface (not shown) for each user 110*a*, 110*b*, . . . 110*n* to view, edit, and delete all currently saved canned responses.

According to further aspects, the management server system 114 may be configured to collect customer reviews in a plurality of distinct ways. For example, the verification module 220 may generate and integrate a popup review form after a consumer registers, purchases, logs in, or takes some other authenticatable action (e.g., a customer number or order number), on a business's website. As such, the verification module 220 may be provided with consumer details and verify reviews more reliably and efficiently. For another example, the verification module 220 may generate and transmit an individualized link to a known customer. Such a link may only be used to leave a single review and must be done within a specific timeframe. Reviews collected via such a link are considered verified by the verification module 220. In addition, the verification module 220 may generate and transmit a generic link to a large number of individuals or provide it in a public place (e.g., printing out a QR code for in-person patrons to scan). Reviews collected in this manner may be considered unverified by the verification module 220. Next, a list of unverified reviewers information (e.g., name and date) may be generated by the verification module 220 and displayed through the dashboard to each user 110*a*, 110*b*, . . . 110*n* of the provider computing system 108. The verification module 220 may allow each user 110*a*, 110*b*, . . . 110*n* to check off which are verified customers and which are not. No star-ratings or reviews may be displayed during this process. If a review is denied, the reviewer may be notified with a link to appeal. All appeals may be obtained and sent to a sysadmin of the management server system 114 for further review. If a user 110*a*, 110*b*, . . . 110*n* takes no action on an unverified review for a specific timeframe, the review may be automatically considered verified by the verification module 220.

According to aspects of the present disclosure, FIG. 22 illustrates a flowchart of a computer-implemented method 2200 for managing negative and positive reviews of a purchased good or service provided by a user system. Method 2200 may include retrieving 2202, by a computing system (e.g., the management server system 114 of FIG. 1), ratings and reviews relating to at least one purchased product or service provided by a user system (e.g., the provider computing system 108 of FIG. 1) from a plurality of computing devices deployed within the communication network. Method 2200 may further include extracting 2204 a first set of data from the ratings and a second set of data from the reviews, determining 2206 a parameter (e.g., via the grading module 210 of the management server system 114) for the user system based at least upon the first set of data from the ratings, and processing 2208 the second set of data to identify inappropriate content in the reviews. Method 2200 also includes generating 2210 signals to obscure the inappropriate content in the reviews, generating 2212 a graphical user interface comprising a display of a listing of the ratings and reviews, detecting 2214 cursor movements on the graphical user interface, and modifying 2216 the display of the graphical user interface based at least on the cursor movements in relation to the inappropriate content.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements.

The terms "a," "an," "the" and similar referents used in the context of describing the present disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or embodiments of the present disclosure disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments of this present disclosure are described herein, including the best mode known to the inventors for carrying out the present disclosure. Of course, variations on these described embodiments will become apparent to those of ordinary skill in the art upon reading the foregoing description. The inventor expects skilled artisans to employ such variations as appropriate, and the inventors intend for the present disclosure to be practiced otherwise than specifically described herein. Accordingly, this present disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

Specific example embodiments disclosed herein may be further limited in the claims using consisting of or and consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Example embodiments of the present disclosure so claimed are inherently or expressly described and enabled herein.

In closing, it is to be understood that the embodiments of the present disclosure disclosed herein are illustrative of the principles of the present disclosure. Other modifications that may be employed are within the scope of the present disclosure. Thus, by way of example, but not of limitation, alternative configurations of the present disclosure may be utilized in accordance with the teachings herein. Accordingly, the present disclosure is not limited to that precisely as shown and described.

The invention claimed is:

1. A computing server system deployed within a communication network, the computing server system comprising:
- a non-transitory computer-readable storage medium storing machine readable instructions; and
- a processor coupled to the non-transitory computer-readable storage medium and configured to execute the machine readable instructions to:
  - retrieve ratings and reviews relating to at least one purchased product or service provided by a user system from a plurality of computing devices deployed within the communication network;
  - extract a first set of data from the ratings and a second set of data from the reviews;
  - determine a parameter for the user system based at least upon the first set of data from the ratings, a number of the ratings in comparison to a selected threshold value, an operational duration and maturity of the user system in providing the at least one purchased product or service;
  - process the second set of data to identify inappropriate content in the reviews;
  - in response to identifying that a portion of the reviews includes the inappropriate content, disregard the portion of the reviews including the inappropriate content in calculating the parameter;
  - generate signals to obscure the inappropriate content in the reviews;
  - generate a graphical user interface comprising a display of a listing of the ratings and reviews including the signals obscuring the inappropriate content in the reviews;
  - detect cursor movements on the graphical user interface; and
  - modify the display of the graphical user interface based at least on the cursor movements in relation to the inappropriate content.

2. The computing server system of claim 1, wherein the processor is further configured to execute the machine readable instructions to:
- determine a data type of each of the reviews, wherein the data type is at least one of text-based and non-text-based;
- determine a dictionary of words and phrases, substitutions of the words and phrases, and a plurality of separation characters; and
- in response to detecting the data type of one of the reviews is text-based, compare the one of the reviews against the dictionary of words and phrases, the substitutions of the words and phrases, and the plurality of separation characters to identify the inappropriate content.

3. The computing server system of claim 2, wherein the processor is configured to execute the machine readable instructions to detect the cursor movements on the graphical user interface by:
- determining a range of the inappropriate content in the one of the reviews within a webpage document of the display; and
- determining a location of an onscreen cursor.

4. The computing server system of claim 3, wherein the processor is configured to execute the machine readable instructions to modify the display of the graphical user interface by:
- in response to detecting that the location of the onscreen cursor is within the range, deactivating the signals obscuring the inappropriate content.

5. The computing server system of claim 3, wherein the processor is configured to execute the machine readable instructions to modify the display of the graphical user interface by:
- in response to detecting that a mouse click event has occurred when the location of the onscreen cursor is within the range, deactivating the signals obscuring the inappropriate content.

6. The computing server system of claim 3, wherein the processor is configured to execute the machine readable instructions to modify the display of the graphical user interface by:
- in response to detect that the location of the onscreen cursor beyond the range, restoring the signals to obscure the inappropriate content.

7. A computer-implemented method, comprising:
- retrieving, by a processor of a computing server system, ratings and reviews relating to at least one purchased product or service provided by a user system from a plurality of computing devices deployed within a communication network;
- extracting, by the processor of the computing server system, a first set of data from the ratings and a second set of data from the reviews;
- determining, by the processor of the computing server system, a parameter for the user system based at least upon the first set of data from the ratings, a number of the ratings in comparison to a selected threshold value, an operational duration and maturity of the user system in providing the at least one purchased product or service;
- processing, by the processor of the computing server system, the second set of data to identify inappropriate content in the reviews;

in response to identifying that a portion of the reviews includes the inappropriate content, disregarding, by the processor of the computing server system, the portion of the reviews including the inappropriate content in calculating the parameter ;

generating, by the processor of the computing server system, signals to obscure the inappropriate content in the reviews;

generating, by the processor of the computing server system, a graphical user interface comprising a display of a listing of the ratings and reviews including the signals obscuring the inappropriate content in the reviews;

detecting, by the processor of the computing server system, cursor movements on the graphical user interface; and modifying, by the processor of the computing server system, the display of the graphical user interface based at least on the cursor movements in relation to the inappropriate content.

8. The computer-implemented method of claim 7, further comprising:

determining a data type of each of the reviews, wherein the data type is at least one of text-based and non-text-based;

determining a dictionary of words and phrases, substitutions of the words and phrases, and a plurality of separation characters; and in response to detecting the data type of one of the reviews is text-based, comparing the one of the reviews against the dictionary of words and phrases, the substitutions of the words and phrases, and the plurality of separation characters to identify the inappropriate content.

9. The computer-implemented method of claim 8, wherein the detecting the cursor movements on the graphical user interface comprises:

determining a range of the inappropriate content in the one of the reviews within a webpage document of the display; and determining a location of an onscreen cursor.

10. The computer-implemented method of claim 9, wherein the modifying the display of the graphical user interface comprises:

in response to detecting that the location of the onscreen cursor is within the range, deactivating the signals obscuring the inappropriate content.

11. The computer-implemented method of claim 9, wherein the modifying the display of the graphical user interface comprises:

in response to detecting that a mouse click event has occurred when the location of the onscreen cursor is within the range, deactivating the signals obscuring the inappropriate content.

12. The computer-implemented method of claim 9, wherein the modifying the display of the graphical user interface comprises:

in response to detect that the location of the onscreen cursor beyond the range, restoring the signals to obscure the inappropriate content.

13. A non-transitory computer-readable storage medium having instructions that, if executed by a processor of a computing server system, cause the computing server system to:

retrieve ratings and reviews relating to at least one purchased product or service provided by a user system from a plurality of computing devices deployed within a communication network;

extract a first set of data from the ratings and a second set of data from the reviews;

determine a parameter for the user system based at least upon the first set of data from the ratings, a number of the ratings in comparison to a selected threshold value, an operational duration and maturity of the user system in providing the at least one purchased product or service;

process the second set of data to identify inappropriate content in the reviews;

in response to identifying that a portion of the reviews includes the inappropriate content, disregard the portion of the reviews including the inappropriate content in calculating the parameter;

generate signals to obscure the inappropriate content in the reviews;

generate a graphical user interface comprising a display of a listing of the ratings and reviews including the signals obscuring the inappropriate content in the reviews;

detect cursor movements on the graphical user interface; and modify the display of the graphical user interface based at least on the cursor movements in relation to the inappropriate content.

14. The non-transitory computer-readable storage medium of claim 13, wherein the instructions further cause the computing server system to:

determine a data type of each of the reviews, wherein the data type is at least one of text-based and non-text-based;

determine a dictionary of words and phrases, substitutions of the words and phrases, and a plurality of separation characters; and in response to detecting the data type of one of the reviews is text-based, compare the first review against the dictionary of words and phrases, the substitutions of the words and phrases, and the plurality of separation characters to identify the inappropriate content.

15. The non-transitory computer-readable storage medium of claim 13, wherein the instructions further cause the computing server system to:

determine a range of the inappropriate content in one of the reviews within a webpage document of the display; and determine a location of an onscreen cursor; and in response to detect that the location of the onscreen cursor beyond the range, restore the signals to obscure the inappropriate content.

16. The non-transitory computer-readable storage medium of claim 15, wherein the instructions further cause the computing server system to:

in response to detecting that the location of the onscreen cursor is within the range, deactivate the signals obscuring the inappropriate content.

17. The non-transitory computer-readable storage medium of claim 15, wherein the instructions further cause the computing server system to:

in response to detecting that a mouse click event has occurred when the location of the onscreen cursor is within the range, deactivate the signals obscuring the inappropriate content.

* * * * *